(12) United States Patent
Nishino et al.

(10) Patent No.: US 7,545,553 B2
(45) Date of Patent: Jun. 9, 2009

(54) DISPLAY CONTROL SYSTEM FOR SPATIAL LIGHT MODULATORS

(75) Inventors: Hirokazu Nishino, Akishima (JP); Kazuma Arai, Hachioji (JP); Fusao Ishii, Menlo Park, CA (US); Yoshihiro Maeda, Hachioji (JP); Taro Endo, Chofu (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 8 days.

(21) Appl. No.: 11/894,247

(22) Filed: Aug. 18, 2007

(65) Prior Publication Data

US 2008/0074563 A1   Mar. 27, 2008

Related U.S. Application Data

(60) Provisional application No. 60/841,125, filed on Aug. 30, 2006.

(51) Int. Cl.
*G02B 26/00* (2006.01)
*G02B 26/08* (2006.01)

(52) U.S. Cl. ...................... 359/290; 359/198
(58) Field of Classification Search .......... 359/198, 359/213, 224, 237, 290
See application file for complete search history.

(56) References Cited

U.S. PATENT DOCUMENTS

| 4,992,931 | A | 2/1991 | Hirasawa |
| 5,617,243 | A | 4/1997 | Yamazaki et al. |
| 5,668,611 | A | 9/1997 | Ernstoff et al. |
| 5,706,123 | A | 1/1998 | Miller et al. |
| 6,454,417 | B1 | 9/2002 | Takamoto et al. |
| 6,719,427 | B2 | 4/2004 | Sakashita et al. |
| 6,999,224 | B2 | 2/2006 | Huibers |
| 7,019,884 | B2 * | 3/2006 | Kirch et al. .............. 359/290 |
| 2003/0086179 | A1 | 5/2003 | Kowarz et al. |
| 2005/0206992 | A1 | 9/2005 | Ishii |
| 2005/0254116 | A1 | 11/2005 | Ishii |

* cited by examiner

*Primary Examiner*—William C Choi
(74) *Attorney, Agent, or Firm*—Bo-In Lin

(57) ABSTRACT

A display control system, comprises: a spatial light modulator (SLM) constituted by a plurality of pixel elements placed in array; a first control unit for controlling each of the plurality of pixel elements under a state of ON or OFF; a second control unit for controlling each of the plurality of pixel elements under a state other than the ON or OFF states; a control changeover unit for dividing one frame period, for each pixel element of the plurality thereof, into a period of the first control unit controlling and that of the second control unit controlling, and also changing over between a control of the first control unit and that of the second control unit for each pixel element of the plurality thereof; and a data division unit for dividing input data to each of the plurality of pixel elements into first control unit-use data, which is input to the first control unit, and second control unit-use data which is input to the second control unit in accordance with the content of the present input data.

13 Claims, 20 Drawing Sheets

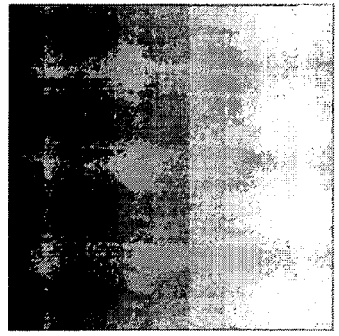 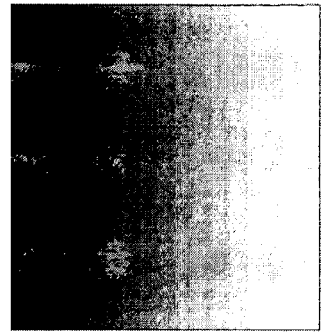
Lower gray scale　　　　　　　　Higher gray scale
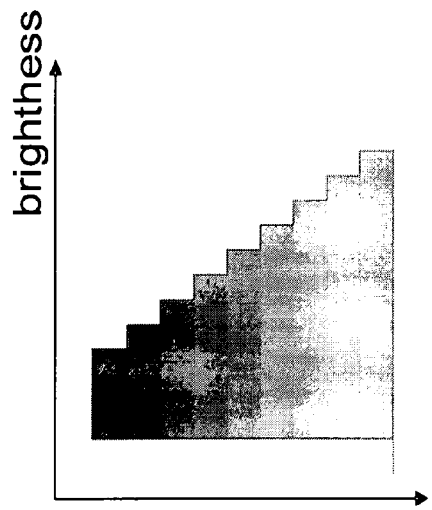 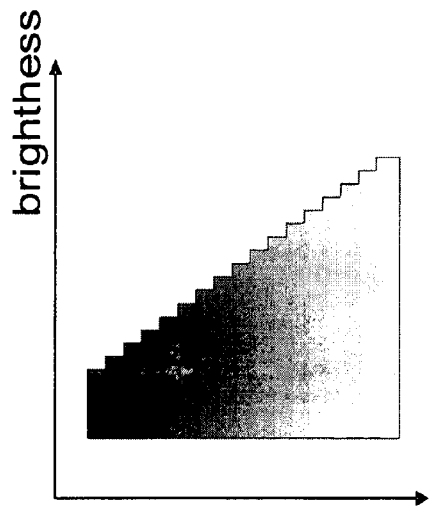
Less levels of brightness　　　　More levels of brightness
FIG. 2A　　　　　　　　　　　FIG. 2B

DISPLAY CONTROL SYSTEM FOR SPATIAL LIGHT MODULATORS

This application is a Non-provisional Application of a Provisional Application 60/841,125 filed on Aug. 30, 2006. The Provisional Application 60/841,125 is a Continuation in Part (CIP) Application of a pending U.S. patent application Ser. No. 11/121,543 filed on May 4, 2005. The application Ser. No. 11/121,543 is a Continuation in part (CIP) Application of three previously filed Applications. These three applications are Ser. No. 10/698,620 filed on Nov. 1, 2003, Ser. No. 10/699,140 filed on Nov. 1, 2003, and Ser. No. 10/699,143 filed on Nov. 1, 2003 by one of the Applicants of this patent application. The disclosures made in these patent applications are hereby incorporated by reference in this patent application.

BACKGROUND OF THE INVENTION

1. Field of the Invention

The present invention relates to a display control system using a spatial light modulator. More particularly, this invention relates to a control system to improve the display image quality.

2. Description of the Related Art

After the dominance of CRT technology in the display industry over 100 years, Flat Panel Display (noted as "FPD" hereinafter) and Projection Display have obtained popularity because of the smaller form-factor and larger size of screen. Among several types of projection displays, the ones using micro-Spatial Light Modulators (SLMs) are gaining recognition by consumers because of high performance of picture quality as well as lower cost than FPDs. There are two types of a micro-SLM used for projection displays in the market. One is micro-Liquid Crystal Display (LCD) and the other is micromirror technology.

Even though there have been significant advances of the technologies implementing an electromechanical mirror device as an SLM in recent years, there are still limitations and difficulties when it is employed to provide a high quality image. Specifically, when the images are digitally controlled, the image quality is adversely affected due to the fact that the images are not displayed with a sufficient number of gray scales.

An electromechanical mirror device is drawing a considerable interest as an SLM. The electromechanical mirror device consists of "a mirror array" arraying a large number of mirror elements. In general, the mirror elements ranging from 60,000 to several millions are arrayed on a surface of a substrate in an electromechanical mirror device. Referring to FIG. 1A, an image display system 1 including a screen 2 is disclosed in a reference U.S. Pat. No. 5,214,420. A light source 10 is used for generating light energy for illuminating the screen 2. The generated light 9 is further concentrated and directed toward a lens 12 by a mirror 11. Lenses 12, 13 and 14 form a beam columnator operative to columnate light 9 into a column of light 8. An SLM 15 is controlled on the basis of data input by a computer 19 via a bus 18 and selectively redirects the portions of light from a path 7 toward an enlarger lens 5 and onto screen 2. The SLM 15 has a mirror array arraying switchable reflective elements 17, 27, 37, and 47 consisting of a mirror 33 connected by a hinge 30 on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge on the screen 2 so as to form an illuminated pixel 3. When the element 17 is in another position, the light is not redirected toward screen 2 and hence the pixel 3 is dark.

Most of the conventional image display devices such as the devices disclosed in U.S. Pat. No. 5,214,420 implements a dual-state mirror control that controls the mirrors at a state of either ON or OFF. The quality of an image display is limited due to the limited number of gray scales. Specifically, in a conventional control circuit that applies a PWM (Pulse Width Modulation), the quality of the image is limited by the LSB (least significant bit) or the least pulse width as control related to the ON or OFF state. Since the mirror is controlled to operate in an either ON or OFF state, the conventional image display apparatuses have no way of providing a pulse width to control the mirror that is shorter than the control duration allowable according to the LSB. The least quantity of light, which determines on the basis of the gray scale, is the light reflected during the time duration according to the least pulse width. The limited gray scale leads to a degradation of the image.

Specifically, FIG. 1C exemplifies a control circuit for controlling a mirror element according to the disclosures made in U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based on a Static Random Access Switch Memory (SRAM) design. The transistor M9 connected to a Row-line receives a DATA signal via a Bit-line. The memory cell 32-written data is accessed when the transistor M9 that has received the ROW signal on a Word-line is turned on. The latch 32a consists of two cross-coupled inverters, i.e., M5/M6 and M7/M8, which permit two stable states, that is, a state 1 is Node A high and Node B low, and a state 2 is Node A low and Node B high.

The control circuit as illustrated in FIG. 1C controls the micromirrors to switch between two states and the control circuit drives the mirror to oscillate to either an ON or OFF deflected angle (or position) as shown in FIG. 1A. The minimum quantity of light controllable to reflect from each mirror element for image display, i.e., the resolution of gray scale of image display for a digitally controlled image display apparatus, is determined by the least length of time that the mirror is controllable to hold at the ON position. The length of time that each mirror is controlled to hold at an ON position is in turn controlled by multiple bit words. FIG. 1D shows the "binary time periods" in the case of controlling an SLM by four-bit words. As shown in FIG. 1D, the time periods have relative values of 1, 2, 4, and 8 that in turn determine the relative quantity of light of each of the four bits, where the "1" is least significant bit (LSB) and the "8" is the most significant bit. According to the PWM control mechanism, the minimum quantity of light that determines the resolution of the gray scale is a brightness controlled by using the "least significant bit" for holding the mirror at an ON position during a shortest controllable length of time.

As illustrated in FIG. 2A, when adjacent image pixels are displayed with very coarse gray scales caused by great differences of quantity of light, thus, artifacts are shown between these adjacent image pixels. That leads to the degradations of image qualities. The degradations of image qualities are especially pronounced in bright areas of image when there are "bigger gaps" of gray scale, i.e. quantity of light, between adjacent image pixels. It was observed in an image of a person that there were artifacts shown on the forehead, the sides of the nose and the upper arm. The artifacts are caused by a technical limitation that the digitally controlled image does not obtain a sufficient number of the gray scale, i.e. the levels of the quantity of light. At the bright spots of display, e.g., the forehead, the sides of the nose and the upper arm, the adjacent pixels are displayed with visible gaps of light intensities. When the levels of gray scales are increased, the image degradation will be much less even with only twice more levels of gray scales as illustrated in FIG. 2B.

The mirrors are controlled either at ON or OFF position. Then, the quantity of light of a displayed image is determined by the length of time each mirror holds, which is at the ON position. In order to increase the number of levels of the quantity of light, the switching speed of the ON and OFF positions for the mirror must be increased. Therefore the digital control signals need to be increased to a higher number of bits. However, when the switching speed of the mirror deflection is increased, a stronger hinge for supporting the mirror is necessary to sustain for a required number of switches of the ON and OFF positions for the mirror deflection. Furthermore, in order to drive the mirrors with a strengthened hinge toward the ON or OFF positions, applying a higher voltage to the electrode is required. The high voltage may exceed twenty volts and may even be as high as thirty volts. The mirrors produced by applying the CMOS technologies probably is not appropriate for operating the mirror at such a high range of voltages, and therefore the DMOS mirror devices may be required. In order to achieve a control of higher number of the gray scale, a more complicated production process and larger device areas are required to produce the DMOS mirror. Conventional mirror controls are therefore faced with a technical problem that the good accuracy of gray scales and range of the operable voltage have to be sacrificed for the benefits of a smaller image display apparatus.

There are many patents related to the control of quantity of light. These patents include U.S. Pat. Nos. 5,589,852, 6,232, 963, 6,592,227, 6,648,476, and 6,819,064. There are further patents and patent applications related to different sorts of light sources. These patents include U.S. Pat. Nos. 5,442,414, 6,036,318 and Application 20030147052. Also, The U.S. Pat. No. 6,746,123 has disclosed particular polarized light sources for preventing the loss of light. However, these patents or patent applications do not provide an effective solution to attain a sufficient number of gray scales in the digitally controlled image display system.

Furthermore, there are many patents related to a spatial light modulation that includes the U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions do not provide a direct solution for a person skilled in the art to overcome the above-discussed limitations and difficulties. Therefore, a need still exists in the art of image display systems applying digital control of a micromirror array as an SLM to provide new and improved systems such that the above-discussed difficulties can be resolved. The most difficulty in increasing the number of gray scales is that the conventional systems have only ON or OFF state and the minimum ON time exists. The minimum ON time determines the height of the steps of gray scale in FIG. 2.

For example, the conventional micromirrors can achieve about 20 microseconds of minimum ON time or LSB, but shortening the minimum ON time is difficult because it requires stronger hinges for moving the mirrors faster and a higher voltage to drive them. Instead of shortening the minimum ON time, if lower level of brightness than the step can be generated, the number of gray scales is increased and the degradation of picture quality is reduced substantially. This is why intermediate states of display pixels have been proposed in the earlier applications of Ser. Nos. 11/121,543, 11/136, 041, and 11/183,216.

However further investigations have indicated that the inaccuracy of manufacturing processes of micromirrors probably cause variations of the brightness output by mirror pixels due to the variation of the speed of mirrors, especially when an ON time is the minimum.

The thickness of hinges and the mass of mirrors can vary due to variations in the manufacturing processes. These variations affect the speed of the movement of mirrors. The rise time of the mirror movement is defined as the time for a mirror moving from an OFF position to an ON position and the fall time can be defined as the time of an opposite movement. If the thickness of a hinge becomes thinner, the rise time of a mirror becomes longer. If the mass of a mirror becomes heavier, the rise time is also longer. As the rise time becomes longer, the effective reflecting of light by the mirror is less even if an electrode is driven during the same ON time. Thus the variation of the manufacturing processes affects the output of light. The effect is more obvious when the ON time becomes shorter.

In the meantime, the recent years have been seeing an increasing demand for the quality of a display output of the image for a television (TV) and such. In terms of a resolution, higher resolutions for a high definition TV are in progress, and so higher levels of half tones (i.e., a greater number of gray scales) are being demanded. In a display system employing an SLM modulating the light from a light source, there are two common methods for creating gray scales of a display output as follows. One is the method for performing a PWM control for expressing gray scales with an integration value of the output light intensity within a unit time duration, and another is the method for controlling directly an output light intensity of the SLM in multiple steps equivalent to the number of gray scales. Here, further increasing the number of output gray scales in a display system using the SLM is faced with the problem as follows. A PWM control requires a control of the ON/OFF outputs of the SLM more minutely in shorter time within a unit time duration. A control for a multiple step grayscale output requires a control of the output of an SLM more minutely and in a larger number of steps. In either case, a control load and a securing of the control accuracy are increasingly difficult to manage.

Note that an example technique related to a control method for creating the gray scales of a display output is disclosed in the 2005/0190429A, US2005/0254116A1, US2005/0206992, U.S. Pat. Nos. 5,827,096, 6,999,224 and 6,719,427 for example.

SUMMARY OF THE INVENTION

In consideration of the situation described above, the purpose of the present invention is to implement the brightness satisfying a display purpose and a richer half tone expression by improving the accuracy of a modulation control in a display control system employing an SLM comprising a plurality of pixels placed in array.

In order to accomplish the aforementioned purpose, a display control system according to an aspect of the present invention comprises: a spatial light modulator (SLM) comprising a plurality of pixel elements placed in array; a first control unit for controlling each of the plurality of pixel elements under a state of ON or OFF; a second control unit for controlling each of the plurality of pixel elements under a state other than the ON or OFF states; a control changeover unit for dividing one frame period, for each pixel element of the plurality thereof, into a period of the first control unit controlling and that of the second control unit controlling, and also changing over between a control of the first control unit and that of the second control unit for each pixel element of the plurality thereof; and a data division unit for dividing input data to each of the plurality of pixel elements into first control unit-use data, which is input to the first control unit, and second control unit-use data which is input to the second control unit in accordance with the content of the present input data.

According to the aforementioned aspect, a use of two manners of control methods, i.e., one for outputting gray scales by means of an integral in a temporal axis by using a binary value of the ON and OFF of the SLM and another for outputting an intermediate gray scale by outputting neither the ON nor OFF, that is, an intermediate level, makes it possible to obtain an efficient output of a large number of gray scales with a minimal reduction of contrast. Also enabled is a dynamic variable control of the ratio of data for using the two control methods in accordance with the contents of the data. This configuration enables a high accuracy output of a large number of gray scales without allowing the maximum output brightness to decrease practically.

BRIEF DESCRIPTION OF THE DRAWINGS

FIG. 2A is a diagram exemplifying a lower level gray scale;

FIG. 2B is a diagram exemplifying a higher level gray scale;

DESCRIPTION OF THE PREFERRED EMBODIMENTS

The following is a description of the preferred embodiment of the present invention by referring to the accompanying drawings.

Figure 1A:
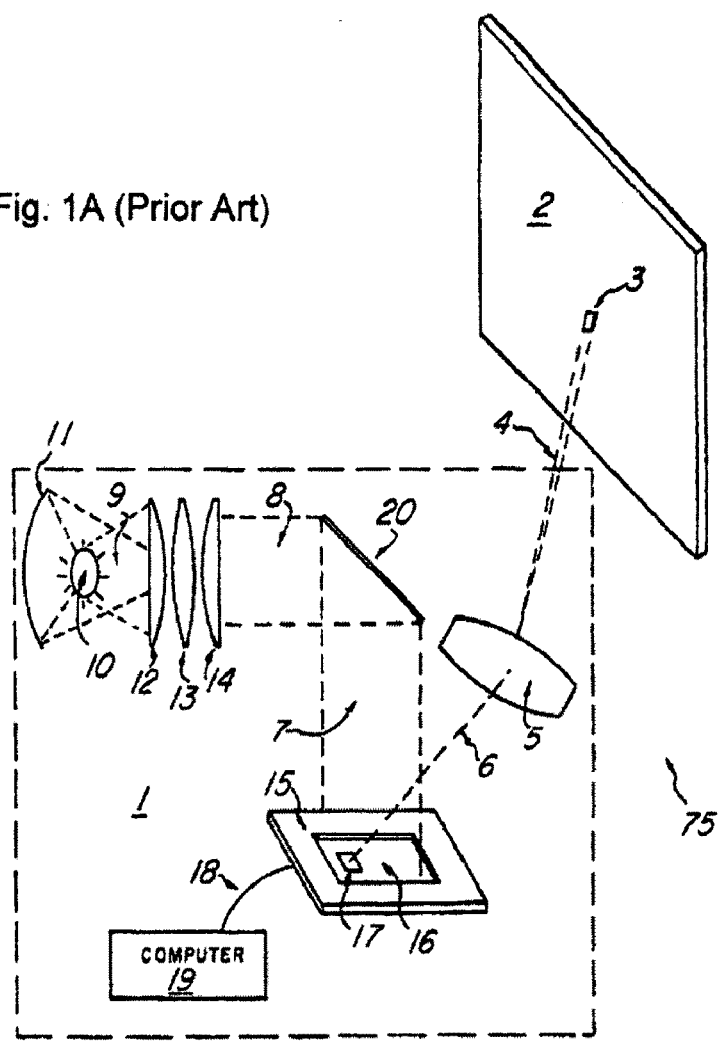
FIGS. 1A and 1B are functional block diagram and a top view of a portion of a micromirror array implemented as a spatial light modulator for a digital video display system of a conventional display system disclosed in a prior art (patent)
Figure 1B:
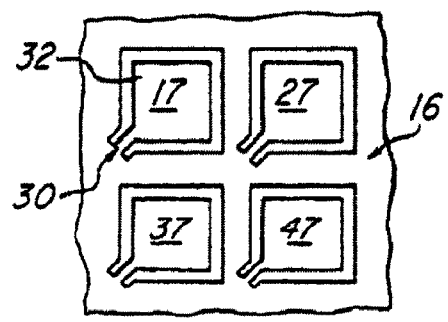
Figure 1C:
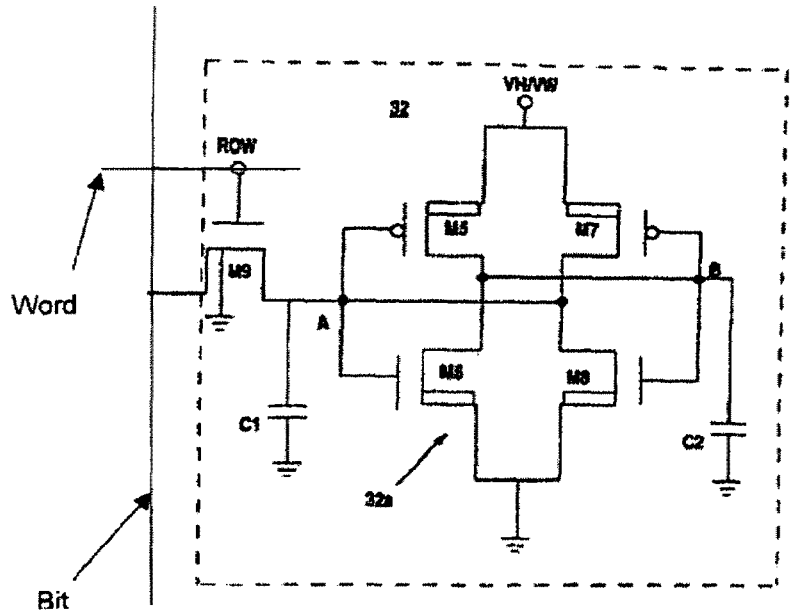
FIG. 1C is a circuit diagram showing a prior art circuit for controlling a micromirror to position at an ON and/or OFF states of a spatial light modulator.
Figure 1D:
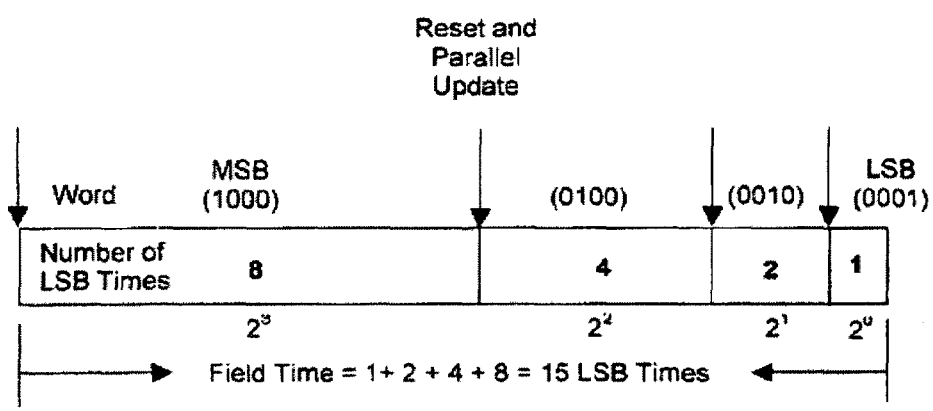
FIG. 1D is diagram showing the binary time intervals for a four bit gray scale.
Figure 3:
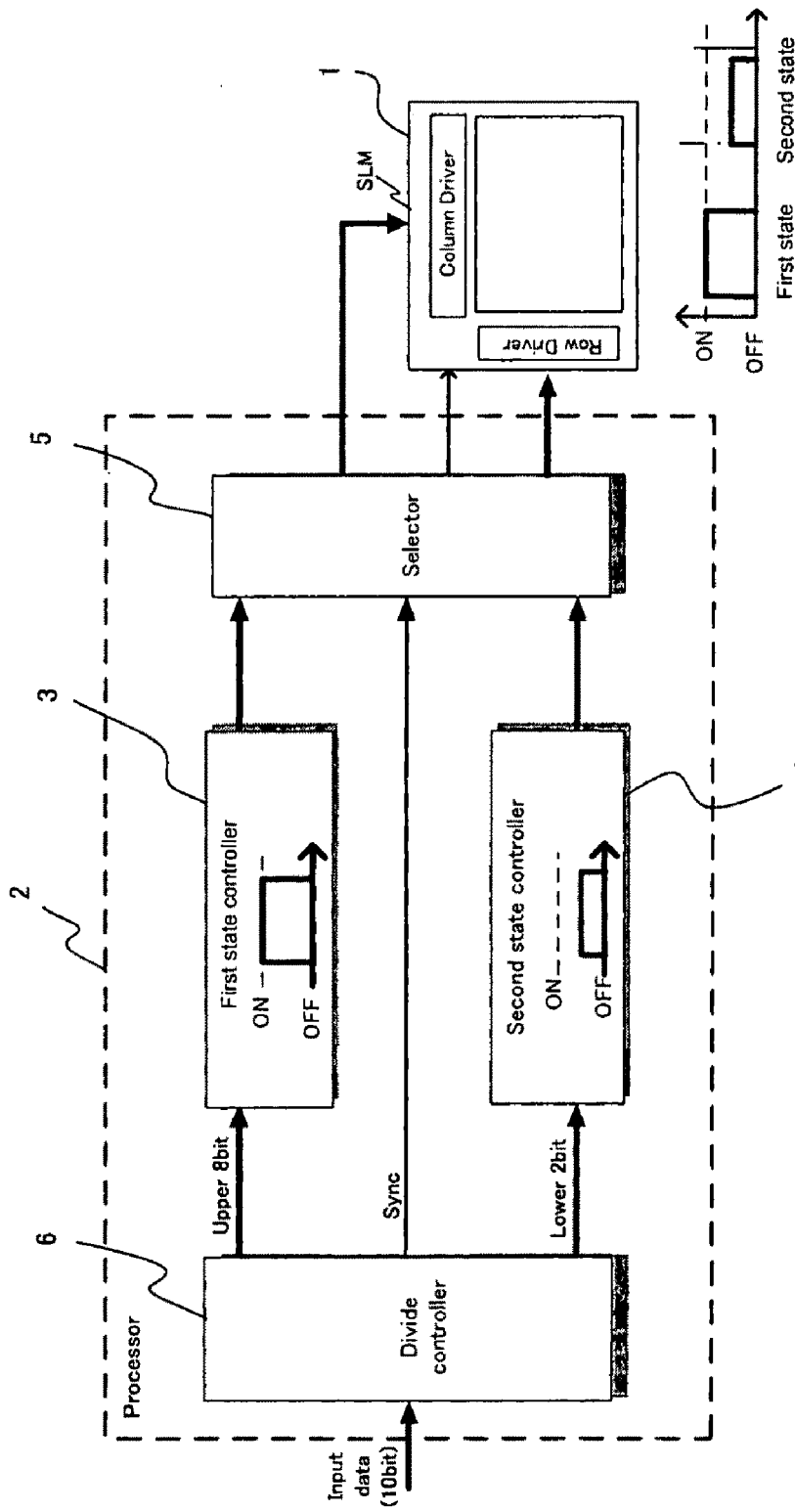
FIG. 3 is a diagram illustrating the basic configuration of a display control system according to a preferred embodiment.

FIG. 3 is a functional block diagram for illustrating the major functions carried out by a display control system according to a preferred embodiment. As shown in FIG. 3, the display control system comprises a spatial light modulator (SLM) 1 that includes a plurality of pixel elements arranged in an array configuration with rows and columns. The display control system further includes a processor 2 for controlling the SLM 1 in accordance with input data.

The SLM 1 modulates an incident light from a light source (not shown) under the control of the processor 2. A portion of the light modulated and reflected by the SLM 1 is projected to a projection light path to enter into a projection optical system and then for displaying an image on a screen (not shown).

The processor 2 includes a first state controller, e.g., a first control unit 3, for controlling the pixel elements of the SLM 1 under an ON or OFF state. The processor further includes a second state controller, e.g., a second control unit 4, for controlling the pixel elements of the SLM 1 under an operational state other than the ON and OFF states. The processor further includes a selector, e.g., a control changeover unit 5, for dividing one frame period into a period controlled by the first state controller 3 and that controlled by the second state controller 4 for each pixel element of the SLM 1. The selector 5 also changes over a control of each pixel element of the SLM 1 between that of the first state controller 3 and second state controller 4. The processor 2 further includes a divide controller, e.g., a data division unit 6, for dividing the input data for each pixel element of the SLM 1 into a first state controller-data for inputting to the first state controller 3 and the second state controller-data for inputting to the second state controller 4 in accordance with the content of the input data.

When a 10-bit data is inputted to the processor 2 as input data that is equivalent to one frame period for each pixel element of the SLM 1, the display control system performs the following operations for each pixel element of the SLM 1. First, the divide controller 6 divides the 10-bit data into the upper eight bits as first state controller-data and the remaining lower two bits as second state controller-data in accordance with the content of the input 10-bit data. The divide controller 6 also generates a Sync signal. The first state controller 3 generates a first control signal for controlling a pixel element under the ON or OFF state based on the first state controller-use data. The second state controller 4 generates a second control signal for controlling a pixel element under a state other than the ON or OFF. The selector 5 divides one frame period into a first period controlled by the first control signal and a second period controlled by the second control signal. The selector 5 also selects the first control signal or second control signal in accordance with the divided period, and outputs it to the SLM 1. The selector 5 further performs the following operation based on the Sync signal generated by the divide controller 6. The column driver and the row driver in the SLM 1, drive the pixel elements depending on the state each pixel element. The state of each pixel element is depending on the input applied is either a first control signal or a second control signal. Accordingly, the light incident to a pixel element is modulated in accordance with the state of the present pixel element.

As described above, the display control system is configured to dynamically input a control signal to either one of the two controllers in accordance with the content of the input data. Therefore, the control process applied is optimally adjusted according to the input data. As an example, the first state controller 3 for controlling a pixel element under the ON or OFF state is suitable to controlling bright image data. The second state controller 4 employed to generate an output of an intermediate gray scale by controlling a pixel element under a state other than the ON and OFF state is suitable to controlling dark image data. It is possible to apply a more suitable control process in accordance with the brightness of an image. The first state controller 3 receives and applies the input data for displaying bright image. The second state controller 4 receives and applies the input data for displaying dark image.

Furthermore, the divide controller 6 may also output the input data directly as the first state controller-data or the second state controller-data instead of dividing the input data based on the content of the input data. Each pixel element is controlled only by the first state controller-data or second state controller-data.

Figure 4:
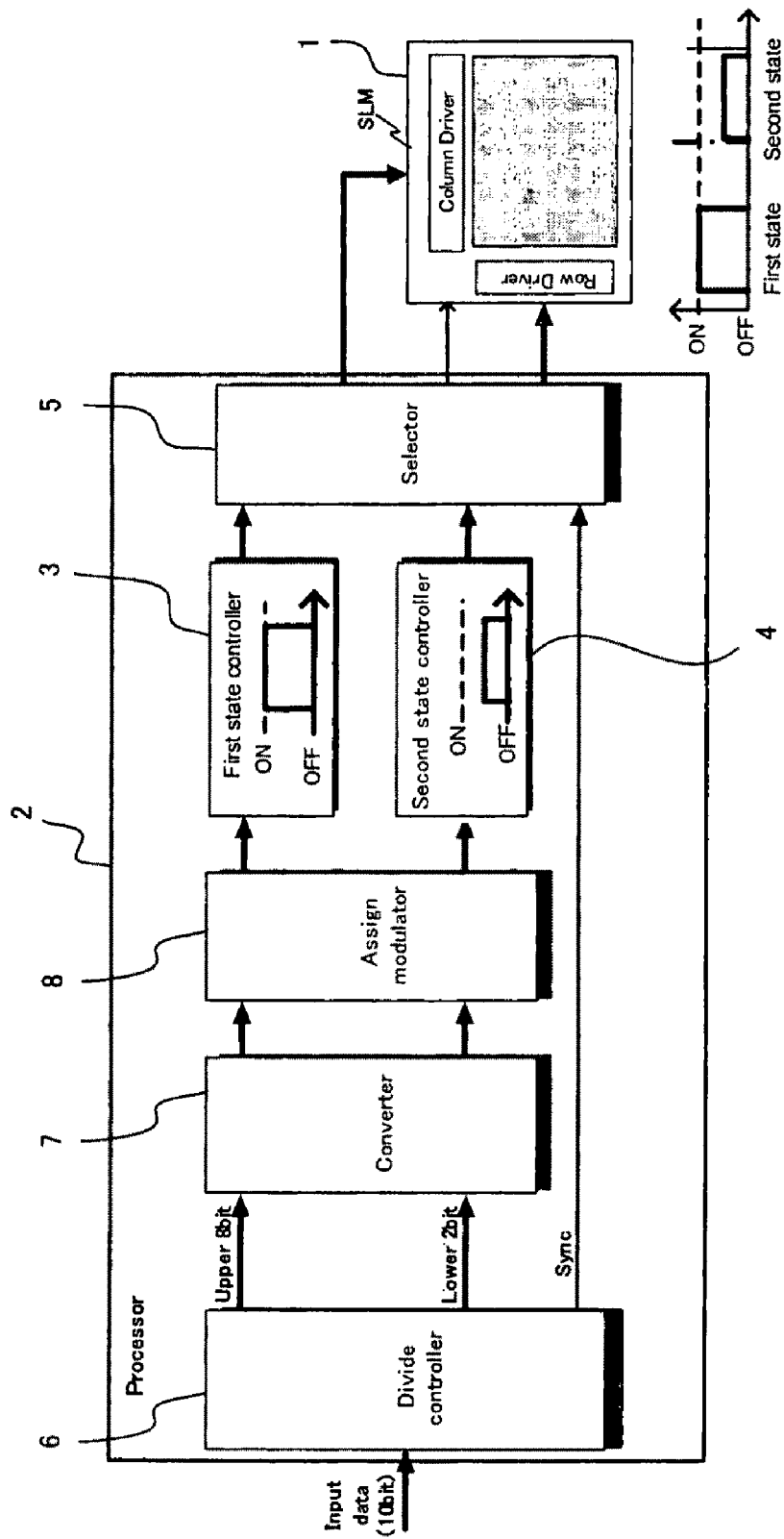
FIG. 4 is a diagram illustrating the basic configuration of a display control system according to a modified embodiment.

Also a conversion process may also depend on the control method(s) of the first state controller 3 and/or second state controller 4. In such a case, a more suitable control process is to allocate the post-division data by changing between one piece and another piece of the converted data depending on the content of the post-conversion data, i.e., the controller-data. Accordingly, the above described display control system may be modified by dividing the input data and applies a conversion process. The conversion process required for each controller is correspondent to each piece of the post-division data to generate two pieces of control-data, followed by changing the allocation of these two pieces of data in accordance with the content of these control-data. FIG. 4 is a functional block diagram for illustrating the major functions carried out by a display control system according to the modified embodiment. As shown in FIG. 4, the display control system is configured with the processor 2 further comprises a converter, e.g., a data conversion process unit 7, for applying a data conversion process to the first state controller-use data in compliance with the first state controller 3 and also applying a data conversion process to the second state controller-use data in compliance with the second state controller 4. The process 2 further includes an assign modulator, e.g., a division data change unit 8, for receiving and checking the contents of the first state controller-data and second state controller-data converted by the converter 7. The assign modulator further changes the data outputted from the divider if necessary.

Figure 5:
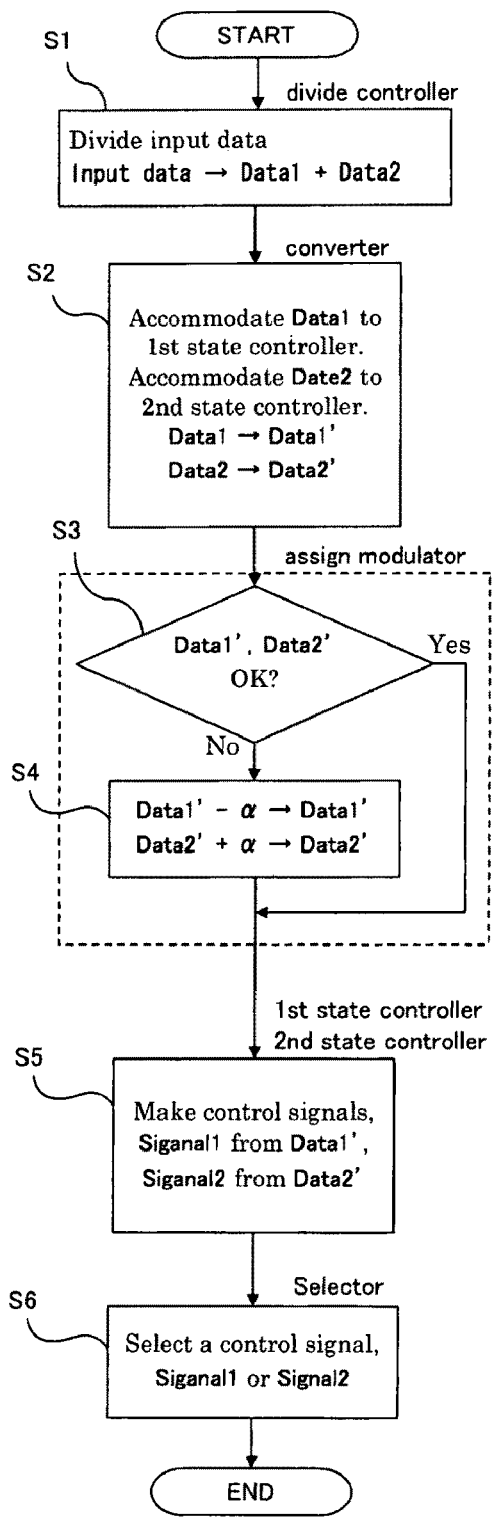
FIG. 5 is a flow chart showing an operation of a processor according to the modified embodiment.

FIG. 5 is a flowchart for showing an operation of a processor 2 according to the modified embodiment. Note that the flowchart shows an example of processing input data for each pixel element of the SLM 1 for one frame period. As shown in FIG. 5, when the input data is input to the processor 2, the divide controller 6 first divides the input data into data1 as the first state controller-data, and data2 as the second state controller-data (step S1). Incidentally, the divide controller 6 also generates a Sync signal in this step.

Then, the converter 7 converts the data1 into data1', i.e., the data compliant to the first state controller 3, and also converts the data2 into data2', as data compliant to the second state controller 4 (step S2).

Then, the assign modulator 8 checks and makes a determination of the contents of the data1' and data2' and makes a determination that whether or not the allocation of data needs to be changed (step S3). If the allocation of data needs to be changed, a determination of "no" for step S3), the assign modulator changes the data allocation (step S4), while if an allocation change is necessary, a determination of "yes" for step S3, no change of data allocation is performed.

In process for changing the allocation in the step S4, the value of the content of the data1' is changed to a value by subtracting a prescribed value α from the present value, and also the value of the content of the data2' is changed to a value by adding a prescribed value α to the present value.

Then, the first state controller 3 generates a signal designated as signal1, which is the first control signal, based on the data1', and the second state controller 4 generates a signal designated as signal2, which is the second control signal, based on the data2' (step S5).

Then, the selector 5 selects the signal1 or signal2 and outputs it to the SLM 1 (S6). In this step, the selector 5 divides one frame period into a period controlled by the signal1 and another period controlled by signal2 and also selects the signal1 or signal2 in accordance with the divided period and outputs the resultant to the SLM 1. The process is performed on the basis of the Sync signal generated by the divide controller 6 in the S1.

The input first control signal or second control signal are received by the column driver and row driver to control the operational state of pixel elements for modulating the incident light at the SLM 1. The display control system is capable of dividing the input data into data1 and data2, and changing the allocation of data1' and data2' in accordance with the content of the data1' after converting the data1 in compliance with the first state controller 3 and with that of the data2' after converting the data2 in compliance with the second state controller 4. More flexible and better control of image modulation is therefore achieved.

The display control system described above can also be further modified as follows. When there is a need to change the allocation of data in the control system shown in FIG. 4, a further possible modification is employ the assign modulator 8 to instruct the divide controller 6 to perform a re-division by changing the data division ratio. The divide controller 6 repeats a process of data division in response to the instruction and the converter 7 repeats a data conversion process to the first state controller-data and second state controller-data which have been divided again by the divide controller 6.

Figure 6:
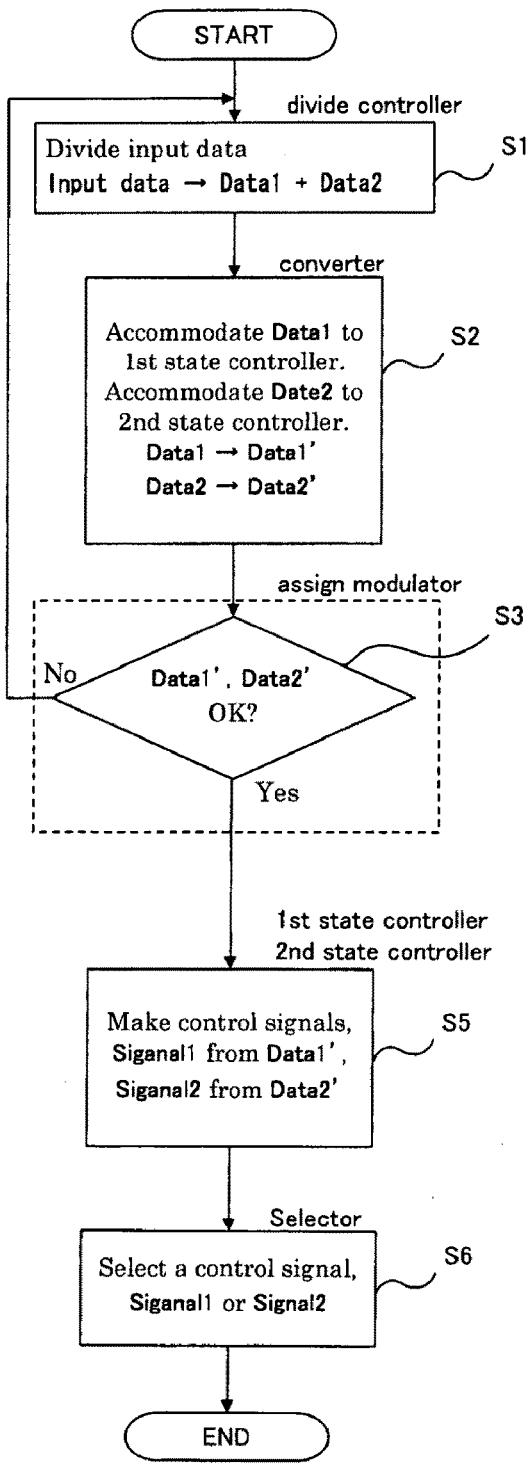
FIG. 6 is a flow chart showing an operation of a processor according to another modified embodiment.

FIG. 6 is a flowchart for showing an operation of the processor 2 according to the aforementioned modified process. The flowchart is approximately the same as one shown in FIG. 5, except for the operation after the checking and determination that the allocation of data is necessary, a determination of "yes" in step S3. When the assign modulator 8 determines that a change of data allocation is necessary after checking the contents of the data1' and data2' according to the processes of the S1 and S2 described above, the modulator instructs the divide controller 6 to repeat a division of the input data by changing the division ratios and the process returns to the step S1.

When the process returns to the step S1 the divide controller 6 repeats a division process by dividing the input data with new division ratios (step S1). Then, the converter 7 performs the conversion process again to the new data1 and data2 obtained by the division process performed by the divide controller 6 (step S2). The converter converts the new data1 into new data1' compliant to the first state controller 3 and the new data2 into new data2' compliant to the second state controller 4. The ensuing processes are the same as described above.

Accordingly, the display control system as modified may also obtain a benefit similar to the display control system according to the modified embodiment described by referring to FIGS. 4 and 5. Meanwhile, unlike the systems shown FIGS. 4 and 5, the display control system as now modified embodiment, is configured to allow the divide controller 6 to repeat a division process for the input data if a change of the allocation of data is necessary, thereby eliminating unnecessary data processing steps at the assign modulator 8.

The control system as now modified embodiment is configured for higher speed operations when the divide controller 6 retains pre-division input data. The system as now modified further provides a capability of enabling the assign modulator 8 to instruct the divide controller 6 to carry out a specific data division method by an instruction that includes the position of a data division. The modulator further issues a notification signal as a flag to prompt the divide controller 6 to divide data in accordance with a prescribed data re-division method. In such a case, the prescribed data division method is stored in memory (not shown) in the processor 2 as a table of data defining the number of times of data division, i.e., the nth time of data division, and the division method specified for the nth time.

The display control system described above is configured to allow an application of a micromirror device comprising a plurality of mirror elements placed in array as the SLM 1. In an exemplary embodiment, the first state controller 3 is a PWM control unit for generating output gray scales by the total number of ON operations within a unit time duration, while the second state controller 4 is an intermediate grayscale control unit for controlling an output gray scale under an intermediate level.

With the configuration described above, a combination of the control processes carried out by the PWM control unit with the control processes carried out by the intermediate grayscale control unit eliminates a requirement for controlling the micromirror operated with the ON/OFF states at a higher speed. A larger number of gray scales are achievable by implementing the PWM control unit in combination with a control unit for controlling the micromirrors to operate at multiple-steps of intermediate states. Furthermore, such improvements are achievable without require the controller to carry out control processes of higher accuracy.

Furthermore, the control processes as disclosed is also applicable to resolve the limitation when the control system has control unit time duration due to the control band of a control circuit or a limitation of the control unit time durations. Under such circumstances, by applying control method enables the control system to maintain a period of the intermediate output in the intermediate grayscale control unit at no less than a prescribed period across practically all gray scales. As a result, the application of the control method as disclosed makes it possible to achieve a gray scale display with more minutely than the minimum display gray scales as that dictated by the control circuit. Also by applying the control process as now described, a change of the control unit time duration for a grayscale display at the intermediate grayscale control unit in accordance with a display timing, e.g., the display frame period, makes it possible to achieve a higher level grayscale display without being limited by the control unit time duration of the control circuits.

Figure 7:
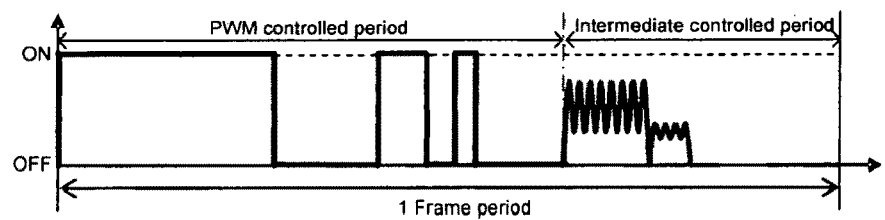
FIG. 7 is a diagram exemplifying a control in one frame period for one mirror element when combining the control of a PWM control unit with that of an intermediate grayscale control unit.

FIG. 7 is a timing diagram for illustrating a control process in one frame period for one mirror element when combining the control of the PWM control unit with that of the intermediate grayscale control unit. Referring to FIG. 7, the "PWM controlled period" indicates a period of a mirror element is controlled by applying a PWM control process, and the "intermediate controlled period" indicates the time period when the mirror element is controlled by applying an intermediate control signals. During the "PWM controlled period", a grayscale output control is performed by a mirror of the mirror element being placed under an ON control or OFF control. And during a part period in the "intermediate controlled period", an intermediate grayscale control is performed by controlling a mirror to oscillate in two different oscillation amplitudes.

Figure 8:
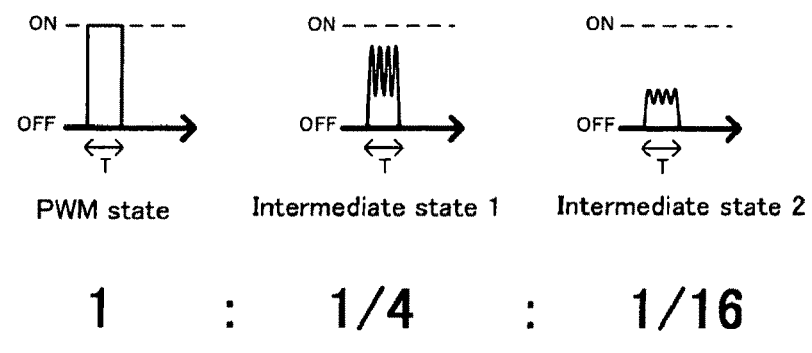
FIG. 8 is a diagram showing an output light intensity ratio per unit time duration when a PWM control performs an ON control of a mirror and when an intermediate grayscale output control performs an oscillation control of the mirror.

FIG. 8 is a intensity versus control state diagram for showing an output light intensity ratio per unit time duration when a PWM control process is applied to perform an ON control of a mirror and when an intermediate grayscale control signals are applied to perform an oscillation control of the mirror according to the time sequence shown in FIG. 7.

Referring to FIG. 8, the "PWM state" indicates a state of the PWM control by operating a mirror at an ON position for a unit time duration (T). The "intermediate state 1" and "intermediate state 2" indicate two states of different oscillation amplitudes of the intermediate grayscale control by controlling the mirror to oscillate for a unit time duration (T). Note that the "intermediate state 1" and "intermediate state 2" correspond to light intensities generated from the first oscillation state and the second oscillation state in the "intermediate controlled period" described in FIG. 7. The output light intensity in the "PWM state" is defined as "1", the output light intensities in the "intermediate state 1" and "intermediate state 2" are ¼ and ¹⁄₁₆, respectively. Therefore, assuming that the PWM control process is capable of generating an image display with a 256-gray scale, the control process as now described with the intermediate grayscale control unit is capable of generating signals for displaying image with a 4096-gray scale.

The processes of ON control, OFF control and oscillation control of the mirror by are further describe below by referring to FIGS. 9A through 9C.

Figure 9A:
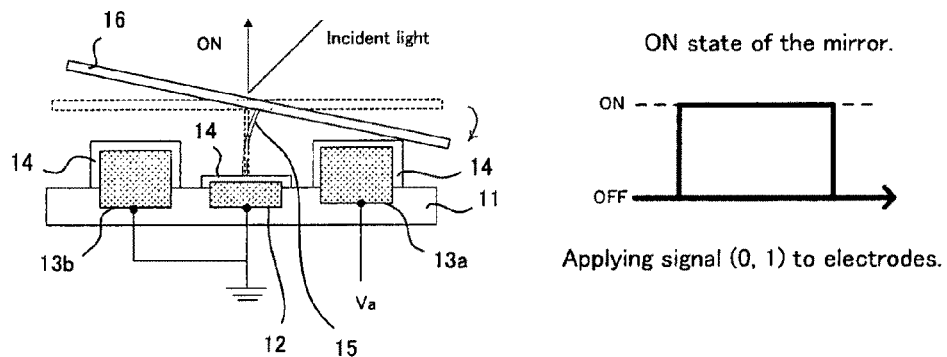
FIG. 9A is a diagram showing a state of mirror (ON state) when the mirror is ON-controlled.

FIG. 9A is a diagram for showing the operation of the mirror when the mirror is controlled to operate in an ON state. FIG. 9B is a diagram for showing the operation of the mirror when the mirror is controlled to operate in an OFF FIG. 9C is a diagram for showing the operation of the mirror when the mirror is controlled to operate in an oscillating. Each of these figures shows a cross-sectional view of a mirror element in each state on the left side and an operation waveform, i.e., a control waveform, of the mirror in each state on the right side. The operation waveform of the mirror in each state also corresponds to the light intensity reflected by the mirror, when operated in each state, to the light along the projection light path for displaying an image.

Figure 9B:
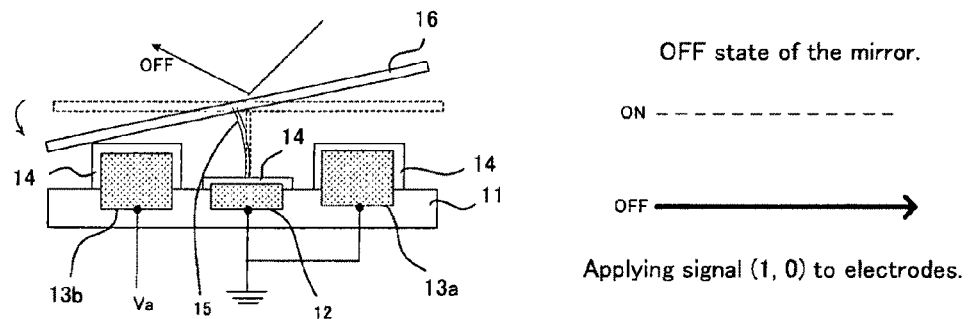
FIG. 9B is a diagram showing a state of mirror (OFF state) when the mirror is OFF-controlled.
Figure 9C:
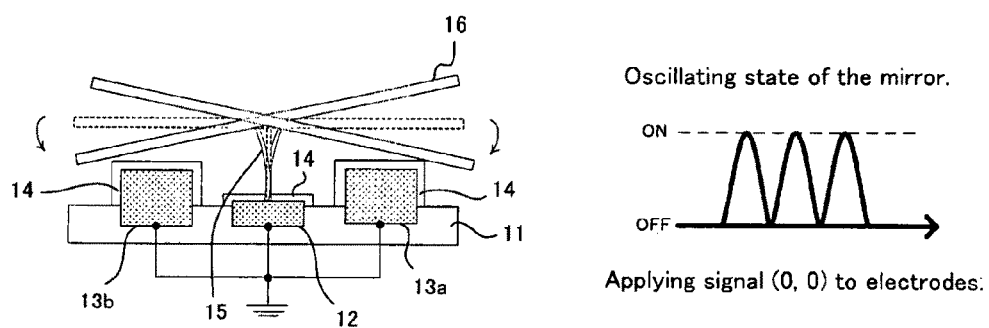
FIG. 9C is a diagram showing a state of mirror (oscillating state) when the mirror is oscillation-controlled.

As shown in FIGS. 9A through 9C, each mirror element according to the present example is provided with a hinge electrode 12 and two address electrodes 13 (i.e., 13a and 13b) on top of a substrate 11, with each electrode being covered with an insulation layer 14. Note that the heights from the substrate 11 to the insulation layer 14 covering the address electrodes 13 are the same. An elastic hinge 15 is connected to the hinge electrode 12 through the insulation layer 14 so that a mirror 16 is allowed to freely incline to different angular positions supported by the elastic hinge 15. The hinge electrode 12 is grounded.

In FIG. 9A, a signal of (0,1) is applied to a memory cell (not shown) of the mirror element to operate the mirror 16 in an ON state. A voltage of $V_a$ volts is applied to the address electrode 13a and a voltage of zero volts to the address electrode 13b. The mirror 16 is drawn by a coulomb force in the direction of the address electrode 13a applied with the voltage of $V_a$ volts. The mirror 16 is inclined to the position to contact the insulation layer 14 of the address electrode 13a. The incident light is reflected from the mirror 16 to the image projection light path. The states of the mirror element and mirror 16 in this event are defined as ON state and the operations of the mirror element and mirror 16 are defined as ON operation.

In FIG. 9B, a signal (1,0) is applied to a memory cell (not shown) of the mirror element to operate the mirror 16 in an OFF state. A voltage of $V_a$ volts is applied to the address electrode 13b and a voltage of zero volts is applied to the address electrode 13a. The mirror 16 is drawn by a coulomb force in the direction of the address electrode 13b applied with a voltage of $V_a$ volts. The mirror 16 is inclined to the position to contact the insulation layer 14 of the address electrode 13b. The incident light is reflected from the mirror 16 to a direction pointing away from an image projection light path. The states of the mirror element and mirror 16 in this event are defined as OFF state and the operations of the mirror element and mirror 16 are defined as OFF operation.

In FIG. 9C, a signal of (0, 0) is applied to a memory cell (not shown) of the mirror element to operate the mirror 16 in an oscillation state. When the voltage applied to both of the address electrodes 13a and 13b are turned off, the mirror 16 is allowed to freely swing to different angular position relative to the hinge. The mirror 16 starts a free oscillation in accordance with the characteristic of the elastic hinge 15. The incident light is reflected from the mirror 16 to project reciprocally between the direction of the image projection light path and a totally OFF angle opposite from the image projection light path. The states of the mirror element and mirror 16 in this condition are defined as oscillating state and the operations of the mirror element and mirror 16 are defined as oscillation operation.

The intensity diagram of FIG. 9C shows the variation of the light intensity that is oscillating between the ON and OFF states. Alternately, it is also possible to control the mirror to oscillate with an oscillation amplitude smaller than the maximum amplitude shown in FIGS. 7 and 8. In such a case, it is also possible to control the free oscillation to have a smaller amplitude than the maximum amplitude by sending a signal (0, 0) to a memory cell (not shown) of the mirror element just before the mirror 16 moves to the position of contacting the insulation layer 14 of the address electrode 13a or address electrode 13b during the time when the mirror is operated in an ON or OFF states. The signal (0, 0) may also be applied to a memory cell (not shown) of the mirror element when the mirror 16 in an OFF state so as to start the oscillation control, immediately followed by giving a signal (1, 0) to the memory cell for a desired period.

An alternative configuration may be implemented by applying the PWM control unit to control an mirror element to operate in ON state continuously for a period according to a value of an image control signal. The mirror is then controlled to operate in an intermediate state for another predefined length of time according to the image control signal to provide predefined light intensity during a display frame period with additional controllable gray scales.

Figure 10:
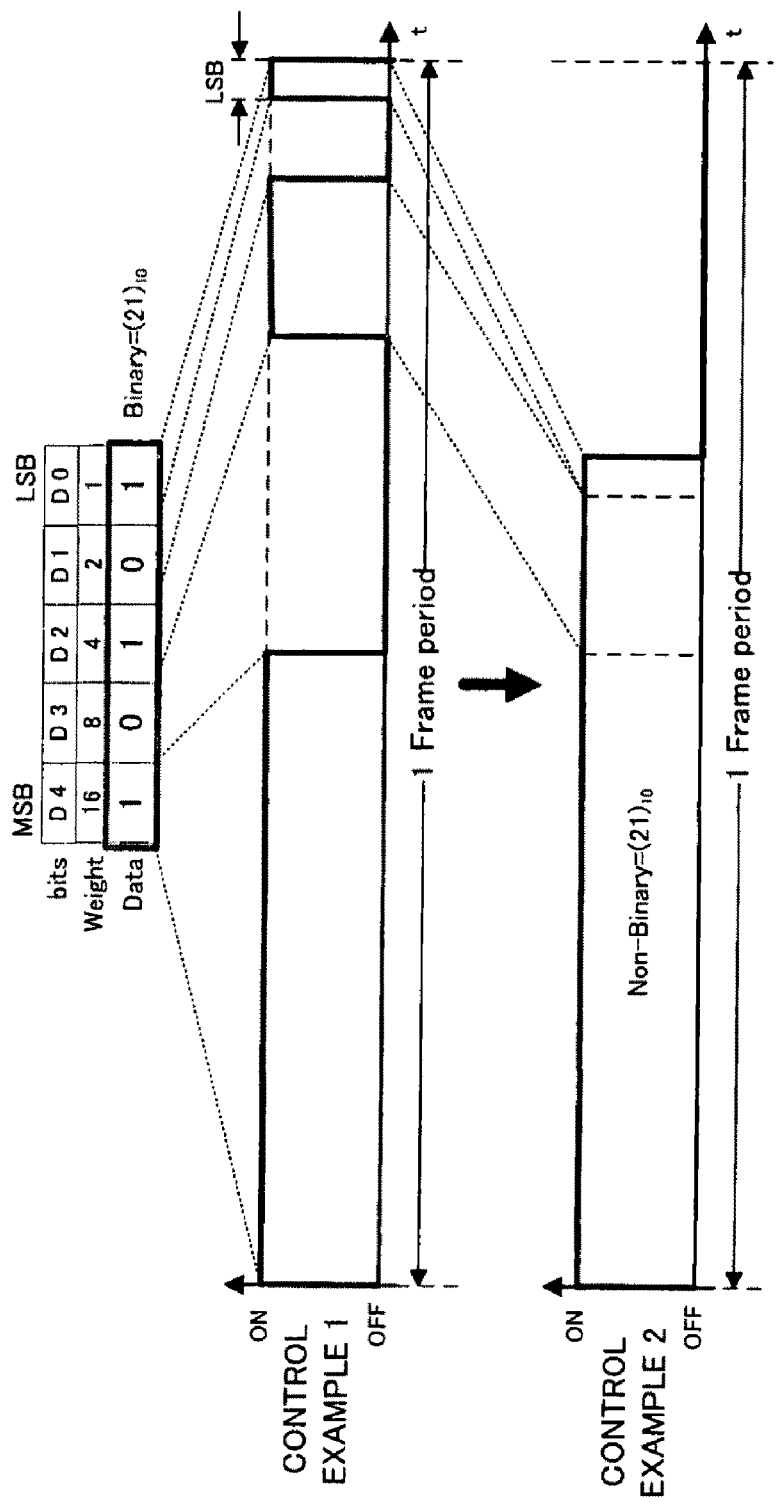
FIG. 10 is a diagram describing an example of the PWM control unit controlling an applicable mirror so as to perform a continuous ON operation for a period of a continuous time duration of a result of a value indicated by the content of the received data multiplied by a control unit time duration.

FIG. 10 is a control diagram for describing an exemplary PWM control unit controlling a mirror to operate a mirror with a continuous ON operation for a period of time according to the image data.

As shown in FIG. 10, when data received is a five-bit "10101" for applying to the PWM control unit, the conventional PWM control unit controls a mirror of the applicable mirror element under the ON state or OFF state in accordance with a period corresponding to the weighting of each bit within one frame period as shown by the "control example 1". In the control example 1 shown in FIG. 10, the mirror is controlled under the states of ON, OFF, ON, OFF and ON in response to the five-bit data "10101". Each of these five bits is weighted by a weighting factor of 16, 8, 4, 2 and 1 respectively according to a sequence starting from the MSB toward the LSB.

In contrast, the control process of this invention is configured to maintain a mirror element at an ON operation continuously for a period according to the value indicated by the content of the data received multiplied by an integer times a control unit time duration controls the mirror element. The control process is applied to operate a mirror in an ON state continuously for a period of a continuous time duration of a result of "21" (i.e., "10101" in the binary expression) which is the value indicated by the content of the received data multiplied by the control unit time duration multiplied by an integer times a time duration corresponding to the weighting of the LSB. The control process is then followed by operating the mirror in an OFF state for the remainder of the period within one frame period as shown by the "control example 2".

The control process carried out by the PWM control unit makes it possible to continue an ON state of the mirror within one frame period without changing the total time duration of the ON state, while the above-described prior control lets the ON state of the mirror dispersed within one frame period. Also, the display control system can be configured such that the intermediate grayscale control unit controls an applicable mirror element so as to perform an oscillation operation only for the number of times corresponding to the content of the received data. A control process to operate the mirror in an oscillation state by the number of oscillations as described above makes it possible to improve the stability and accuracy of gray scale control.

An alternate configuration may be implemented by using the intermediate grayscale control unit to control a selected mirror element so as to perform an oscillation operation for a period corresponding to the content of the received data. A control process to operate the mirror element according to the time duration makes it possible to obtain a sufficient number of gray scales by a simpler control than the case of controlling it by the number of times of oscillations.

Furthermore, by controlling a mirror to function with an oscillation operation for generating the intermediate grayscale makes it possible to obtain an intermediate gray scale and increase the number of gray scales. It is, however, very difficult to control an oscillation control in a very short time or in a very small number of time of oscillations. Therefore, an alternative configuration is to use the divide controller 6 to carry out a data division, or by using the assign modulator 8 to change a data division, or to use the assign modulator 8 to instruct the divide controller 6 for a data re-division so as to make control mirror to oscillate for a time duration that is not less than a predetermined duration. Or alternate to operate for a number of oscillations that is not less than a predetermined number of oscillations. The control process makes it possible to obtain an output of a higher level, more accurate, sufficient number of gray scales.

An example for using the assign modulator 8 to change a data division is described in order to make the control of an oscillation operation performed for a time duration of no less than a predetermined duration or the number of times of no less than a predetermined times. In this case, the assign modulator 8 performs the functions as described below.

When the data that is divided and applied as the second state controller-data by the divide controller 6 has a value smaller than a predetermined first value, the assign modulator checks and determines from the contents of the first state controller-data and second state controller-data converted by the converter 7. Then the assign modulator 8 further changes the value indicated by the content of the first state controller-data converted by the converter 7 by subtracting a predetermined second value from the present value indicated by the content, and also changes the value indicated by the content of the second state controller-data converted by the converter 7 by adding a value based on the second value to the present value indicated by the content. The operations carried out by the assign modulator 8 reallocates a part of the data allocated to the PWM control unit, to the intermediate grayscale control unit performing an oscillation control in the case of an actual performing of the oscillation control within a data frame allocated to a usage of the intermediate grayscale control unit (for an oscillation control) being less than a predetermined amount. The control process makes it possible to more accurate control the number of oscillations and improves the accuracy of gray scale control.

Furthermore, the output of the PWM control unit by using the second value generates an integration value of projection light. The light intensity projecting from the mirror element in accordance with the output of the PWM control unit is equal to the integration value the projection light based on the output of the intermediate grayscale control unit in accordance with the second value. The integration value of the output of the PWM control unit by using the second value corresponds to an integration value of the light intensity projected to the projection light path by a control of the PWM control unit by using the present second value. And the integration value of the output of the intermediate grayscale control unit by using the second value corresponds to an integration value of the light intensity projected to the image projection light path by controlling the intermediate grayscale control unit by using the present second value.

Meanwhile, alternate configuration may be implemented that a plurality of combinations of the first value with the second value is saved in a table stored in memory (not shown) in the processor 2. By saving the first value related a condition for changing a data division (i.e., a condition for reallocating data) and of the second value relating a calculation value for changing a data division if the condition is satisfied makes it possible to perform a more refined control of the oscillation with higher speed and stability.

Additionally, the assign modulator 8 is also capable of executing the processes described below. When most of the upper bits of the data in a frame of the data have a value of zero after the data is converted as second state controller-data and divided by the divide controller 6 as a result of checking the contents of the first state controller-data and second state controller-data which have been converted by the converter 7, the assign modulator 8 changes the value indicated by the content of the first state controller-use data converted by the converter 7 to a value by subtracting a predetermined second value from the present value indicated by the content, and also changes the value indicated by the content of the second state controller-data converted by the converter 7 to a value by adding a value based on the second value to the present value indicated by the content.

The assign modulator 8 thus reallocates a part of the data allocated to the PWM control unit to the intermediate grayscale control unit for performing an oscillation control. This is carried out when a condition that within a data frame allocated to a usage of the intermediate grayscale control unit (for an oscillation control) is less than a half of the maximum amount, thereby making it possible to more accurately control the oscillation.

Incidentally, the modulator 8 also designed to prevent a reduction of the maximum brightness output. Specifically, the assign modulator 8 can also be configured to operate so as to minimize the data allocated to the oscillation control in order to suppress the degradation of the maximum brightness to a minimum while securing the accuracy of the oscillation control. Accordingly in an exemplary embodiment, the second value can be set to a value of the most lower bit if the value of the present most lower bit of the data as the first state controller-use data divided by the divide controller 6 is "1"; or the second value can be set to a value of the lower two bits constituted by the present bit and the most lower bit if one-upper bit of the most lower bit is "1". This configuration makes it possible to generate an output for projecting an image of a high-level gray scale, improved accuracy and prevents unnecessary degradation of the brightness of display.

Figure 11:
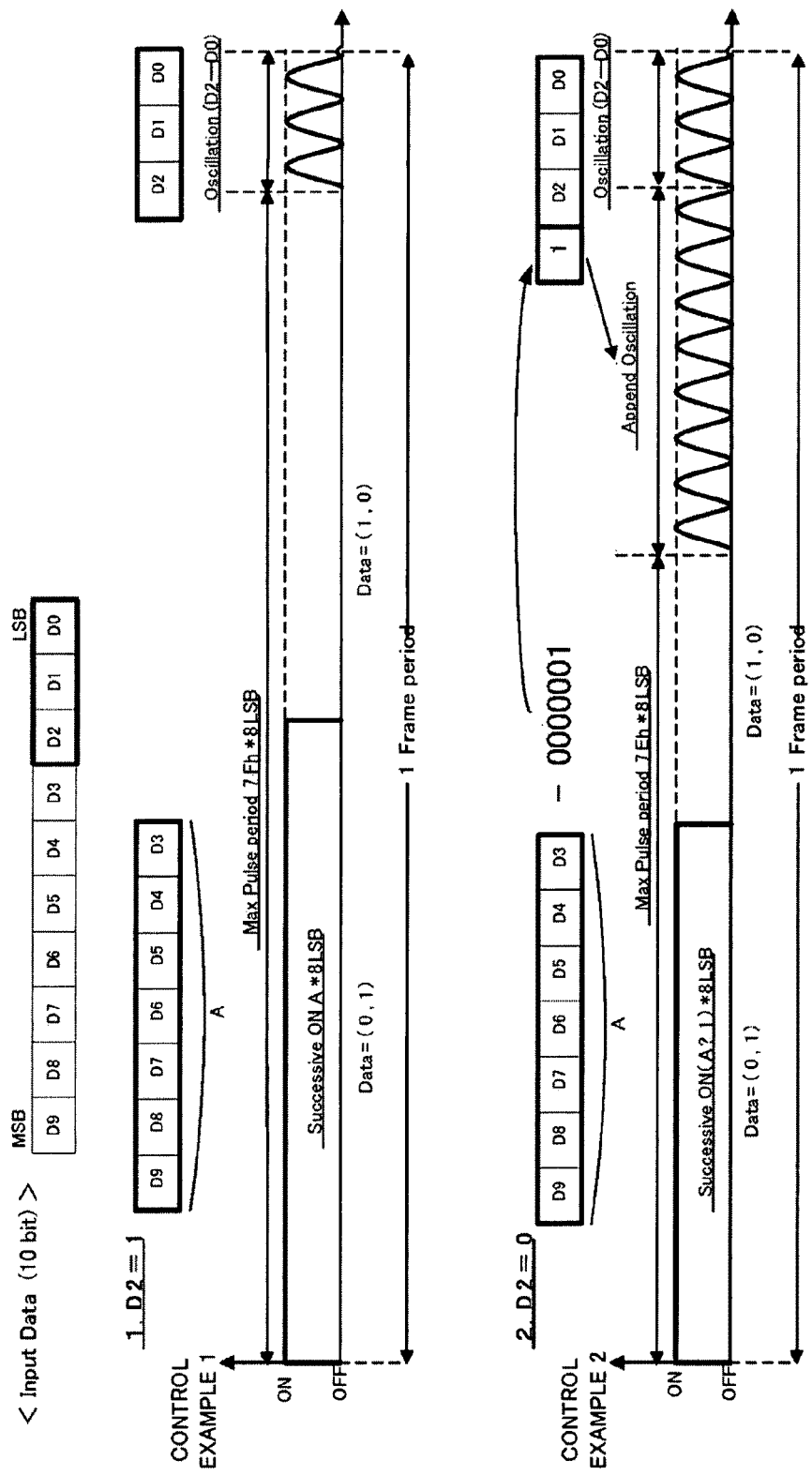
FIG. 11 is a diagram describing an example of control when an assign modulator functions for minimizing data, which is allocated to an oscillation control, to a practically minimum.

The following description explains by an example illustrated in FIG. 11 for setting the second value to the value of the lowest bit when the value of the lowest bit of the data divided by the divide controller 6 is applied as the first state controller-data is "1. FIG. 11 is a timing diagram to illustrate the control process in one frame period of one mirror element. In present example, the most upper bit of the data frame of the data, as second state controller-data, as divided by the divide controller 6 is "0" and that is a result of checking the contents of the first state controller-data and second state controller-data as converted by the converter 7. The assign modulator 8 changes the value indicated by the content of the first state controller-data as converted by the converter 7 to a value by subtracting a predetermined second value from the present value as indicated by the content. The modulator 8 also changes the value indicated by the content of the second state controller-data as converted by the converter 7 to a value by adding a value based on the second value to the present value as indicated by the content. The present example also shows the PWM control unit controls an mirror element to operate in the ON state continuously for a period according to the value indicated by the input data multiplied by an integer times a control unit time duration. Also, it shows the intermediate grayscale control unit controls a selected mirror element in the oscillation operation in accordance with the content of the input data received by the control unit. The input data for each mirror element per one frame period is set to 10-bit, with the weighting of each bit setting to, in order of the MSB to LSB, 512, 256, 128, 64, 32, 16, 8, 4, 2 and 1. Also, the present example presumes that the divide controller 6 divides the 10-bit input data into the upper seven bits as the first state controller-use data and the remaining lower three bits as the second state controller-use data.

In such a case, when the value of the highest bit of the data frame of the three-bit data, as the second state controller-data as divided by the divide controller 6 is "1" (D2=1), as a result of the checking processes described above, the assign modulator 8 does not change a data division. Instead, the modulator 8 outputs the data, as that is received from the converter 7 to the applicable controller. The process is illustrated as the control example 1.

With this process, the control unit time duration at the PWM control unit is eight times as that simply noted as "8LSB" hereinafter, and the time corresponding to the weighting of the LSB (i.e., D0) since the weighting of the D3 is eight, and the PWM controlled period within one frame period (i.e., "max pulse period" shown in FIG. 11) is 7Fh*8LSB. Since the data frame of the post-division data as the first state controller-use data divided by the divide controller 6 is seven-bit and the maximum value of the data is "7Fh". Then, a period in which the mirror element performs an ON operation is continuously within the PWM controlled period and that is an 8LSB times the value (A) of the post-division seven-bit data. That is the first state controller-data divided by the divide controller 6. The value (A) of the seven-bit data is also the value indicated by the content of the data received by the PWM control unit. In the remaining period of the PWM controlled period, the mirror element is turned to an OFF state. And the period other than the PWM controlled period within one frame period is control to operate in an intermediate controlled period (i.e., the period of "oscillation" as shown in FIG. 11). In the intermediate controlled period, the intermediate grayscale control unit controls the mirror element under an oscillating state in accordance with the content of the received data.

In contrast, when the value of the highest bit of the data frame of the post-division three-bit data, i.e., the second state controller-data divided by the divide controller 6, is "0" (i.e., D2=0) as a result of the checking process described above, the assign modulator 8 changes the data division as follows. The modulator 8 further outputs the post-change data to the applicable controller as illustrated in the control example 2 shown in FIG. 11.

In changing the data division, the value as indicated by the content of the first state controller-data is converted by the converter 7 to a value by subtracting from the present value of the value of the lowest bit (i.e., "000001") of the post-division seven-bit data as the first state controller-data divided by the divide controller 6. The modulator 8 also changes the value indicated by the content of the second state controller-data converted by the converter 7 by adding the second value to the present value.

The value indicated by the content of the first state controller-data as that converted by the converter 7 is also the value (A) of the post-division seven-bit data as the first state controller-use data divided by the divide controller 6. And the value indicated by the content of the second state controller-data as converted by the converter 7 is also the value of the post-division three-bit data as the second state controller-data divided by the divide controller 6.

By applying these processes, the PWM controlled period (i.e., the "max pulse period" shown in FIG. 11) within one frame period is 7Eh*8LSB when subtracting the value "0000001" of the lowest bit from 7Fh thus generating a value of 7Eh. And, the period for the mirror element operating in an ON state continuously within the PWM controlled period is an 8LSB times a value by subtracting the value (i.e., "0000001") of the lowest bit from the value (A) of the post-division seven-bit data as the first state controller-use data divided by the divide controller 6. Incidentally, the value by subtracting the value (i.e., "0000001") of the lowest bit from the value (A) of the seven-bit data is also the value indicated by the content of the data received by the PWM control unit. In the remaining period of the PWM controlled period, the mirror element becomes an OFF state. And the period other than the PWM controlled period within one frame period becomes an intermediate controlled period (i.e., "appended oscillation" period plus "oscillation" period which are shown in FIG. 11). In the intermediate controlled period, the intermediate grayscale control unit controls the mirror element to operate in an oscillating state in accordance with the content of the received data. The value indicated by the content of the data received by the intermediate grayscale control unit is a value of a result of adding the value (i.e., "0000001") of the lowest bit of the post-division seven-bit data as the first state controller-use data divided by the divide controller 6 to the value indicated by the content of the second state controller-use data as converted by the converter 7. The period of the "appended oscillation" is the period in which the mirror element is controlled under the oscillating state by using the post-addition value. The period of "oscillation" is the period for the mirror element to operate under the oscillating state by applying the value indicated by the content of the second state controller-data as that converted by the converter 7.

According to an operation described above, the operations carried out by the assign modulator 8 makes it possible to reallocate a part of the data allocated to the PWM control unit to the intermediate grayscale control unit. The allocation takes place if the value of the data allocated to the intermediate grayscale control unit for performing the oscillation control is small, thereby increasing the controlled portion in a frame period for operating the mirror in the oscillation state for improving the accuracy of mirror oscillation and gray scale control.

In the control examples 1 and 2 shown in FIG. 11, the ON control process of a mirror element is performed by applying a signal (0, 1) to the mirror element as shown in FIG. 9A. Also, the OFF control process of a mirror element is performed by applying a signal (1, 0) the mirror electrodes as shown in FIG. 9B. And the oscillation control of a mirror element is performed by giving a signal (0, 0) to the mirror electrodes when the mirror element is OFF controlled as shown in FIG. 9C.

Figure 12A:
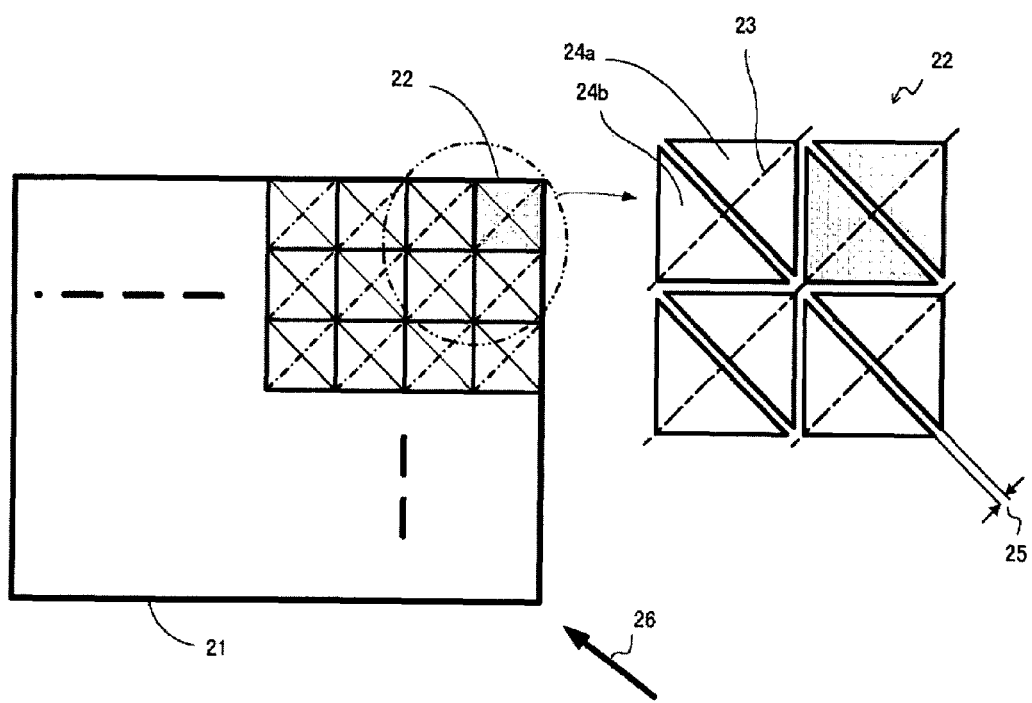
FIG. 12A is a first diagram describing an example of the intermediate grayscale control unit outputting an intermediate gray scale by a method other than an oscillation control of a mirror element.
Figure 12B:
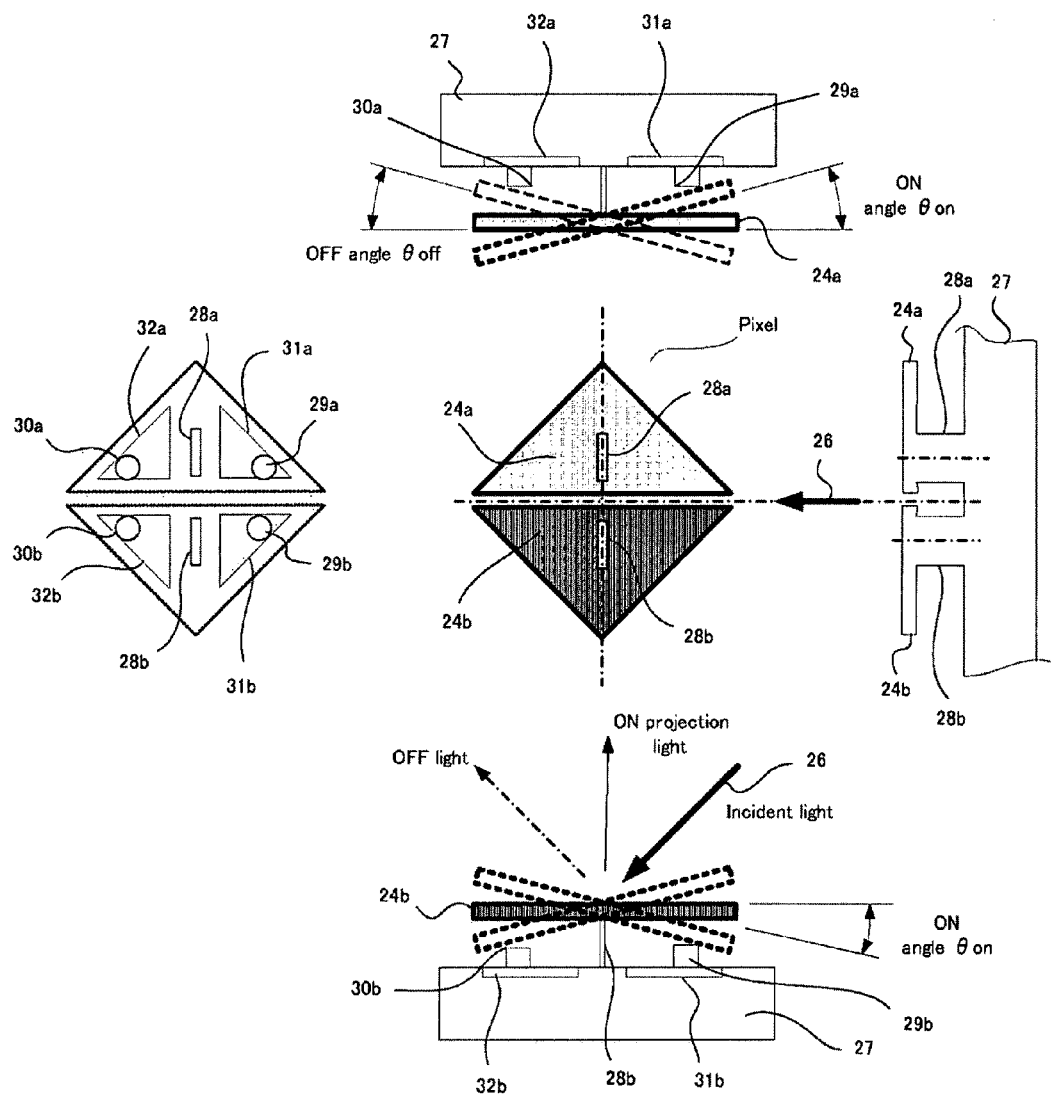
FIG. 12B is a second diagram describing an example of the intermediate grayscale control unit outputting an intermediate gray scale by a method other than an oscillation control of a mirror element.

The display control system described above is configured such that the intermediate grayscale control unit performs a control process to control the oscillation a mirror element, thereby outputting an intermediate gray scale. Meanwhile, it is also possible to apply other control process to generate controllable modulated light for controlling the gray scales of the image display. FIGS. 12A and 12B are diagrams for describing an another exemplary embodiment using a different method for outputting an intermediate light intensity to control the gray scale.

FIG. 12A shows the SLM 1 as an exemplary embodiment of this invention wherein the SLM 1 implemented as a micromirror device that includes a pixel array by configuring a plurality of pixel elements (i.e., mirror elements) as mirror arrays. The left side of FIG. 12A shows a pixel array 21 and the right side of FIG. 12A shows four pixel elements representatively sampled from the pixel array 21. Therefore, the pixel element 22 shown on the left side of FIG. 12A corresponds to the pixel element 22 shown on the right side thereof.

In each of the pixel elements shown on the right side of FIG. 12A, a mirror is divided into two parts along the diagonal line of a mirror and in the direction perpendicular to the deflection axis 23 of a mirror. That is, each pixel element comprises divided two approximate triangle sub-mirrors 24 (i.e., 24a and 24b). Here, a gap 25 between the sub-mirrors of each pixel element is formed in parallel with the optical axis direction of an incident light 26 projected to the SLM as an illumination light. The incident light 26 is projected to the pixel array 21 along a diagonal direction from above. Also, a diffraction light generated by the long side of the sub-mirror 24 is generated in the direction perpendicular to the reflection direction (i.e., the deflection direction) of the incident light on the sub-mirror 24. Therefore, the diffraction light is projected away and does not enter into the image projection light path, i.e., the light path through the projection lens, even when the sub-mirror 24 is in an OFF state. The micromirror device as shown controls two sub-mirrors 24 of each pixel element under the ON state or OFF state simultaneously, thereby reflecting a light with additional control of the ON or OFF states to increase the level of gray scales. The mirrors as shown allow the control system to control one sub-mirror 24a (or 24b) under the ON state, thereby enabling an output of the intermediate gray scale between the ON and OFF.

FIG. 12B shows diagrams for illustrating an exemplary configuration of each pixel element of the pixel array 21 shown in FIG. 12A. Specifically, FIG. 12B shows an top view of a pixel element at the center of the drawing; a cross-sectional view of the pixel element including one sub-mirror 24a on the upper side of the drawing; a cross-sectional view of the pixel element including the other sub-mirror 24b on the lower side of the drawing; a right side view of the pixel element on the right side of the drawing; and an upper perspective view of the pixel element on the lest side of the drawing. As shown in FIG. 12, the sub-mirror 24b is supported on a hinge 28b disposed on a substrate 27 to freely incline to different tilt angles through the deflection of the hinge. An ON stopper 29b and an OFF stopper 30b are placed in symmetrical positions on opposite sides across the hinge 28b on the substrate 27.

An ON electrode 31b is disposed under the ON stopper 29b to apply a prescribed voltage to draw the sub-mirror 24b by a coulomb force to incline to the position physically contacting the ON stopper 29b. The sub-mirror 24b is operated in an ON state. The angle of the sub-mirror 24b in the ON state relative to that in the horizontal state is called an ON angle $\theta_{on}$. To the sub-mirror 24b reflects the incident light 26 to the image projection light path.

An OFF electrode 32b is disposed under the OFF stopper 30b for applying a prescribed voltage to draw the sub-mirror 24b by a coulomb force to incline to the position to contact the OFF stopper 30b. The sub-mirror 24b is operated in an OFF state. And the angle of the sub-mirror 24b in the OFF state relative to that in the horizontal state is called an OFF angle $\theta_{off}$. to the sub-mirror 24b reflects the incident light 26 to an optical path away from the projection light path.

Likewise, the sub-mirror 24a is supported on a flexible hinge 28a disposed on a substrate 27. An ON stopper 29a and an OFF stopper 30a are placed in symmetrical positions on two opposite sides and across the hinge 28a on the substrate 27.

An ON electrode 31a is disposed under the ON stopper 29a for applying a prescribed voltage to draw the sub-mirror 24a by a coulomb force to incline to an angular position to contact the ON stopper 29a. The sub-mirror 24a is operated in an ON state. And the angle of the sub-mirror 24a in the ON state relative to that in the horizontal state is called an ON angle $\theta_{on}$. The sub-mirror 24a reflects the incident light 26 to the image projection light path.

Also likewise, an OFF electrode 32a is disposed under the OFF stopper 30a for applying a prescribed voltage to draw the sub-mirror 24a by a coulomb force to incline to contact the OFF stopper 30a. The sub-mirror 24a is operated in an OFF state. And the angle of the sub-mirror 24a in the OFF state relative to that in the horizontal state is called an OFF angle $\theta_{off}$. The sub-mirror 24a reflects the incident light 26 to a direction away from and outside of the image projection light path.

These two sub-mirrors 24 are controlled simultaneously under the ON state or OFF state, thereby allow for additional control to generate an output of the ON or OFF gray scale by controlling only one sub-mirror 24a or 24b under the ON state. The sub-mirrors enables the mirror device to control the modulation with an intermediate gray scale between the ON and OFF states.

Figure 13A:
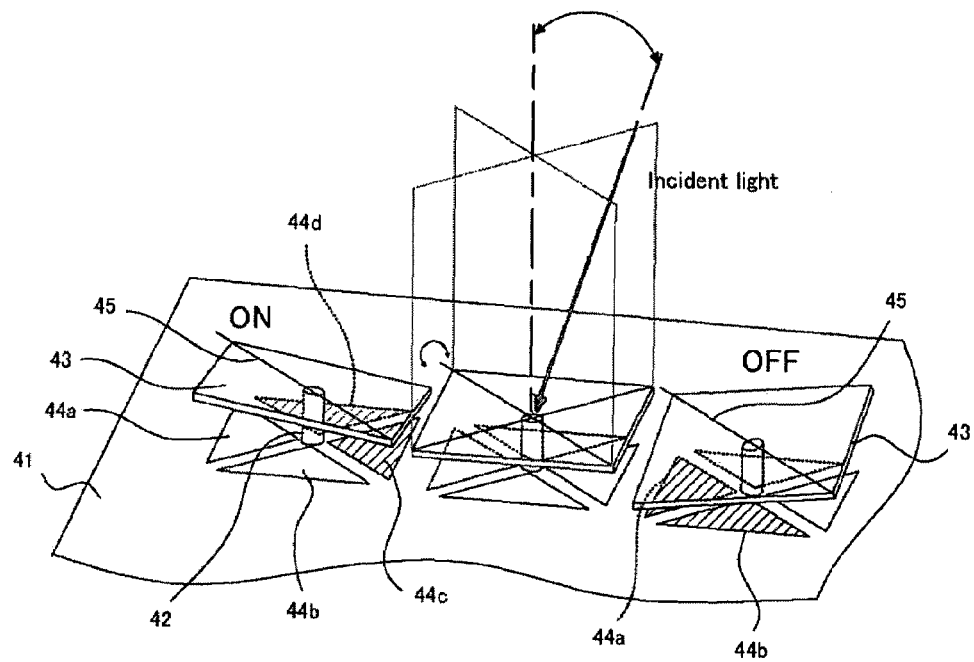
FIG. 13A is a first diagram describing another example of the intermediate grayscale control unit outputting an intermediate gray scale by a method other than an oscillation control of a mirror element.
Figure 13B:
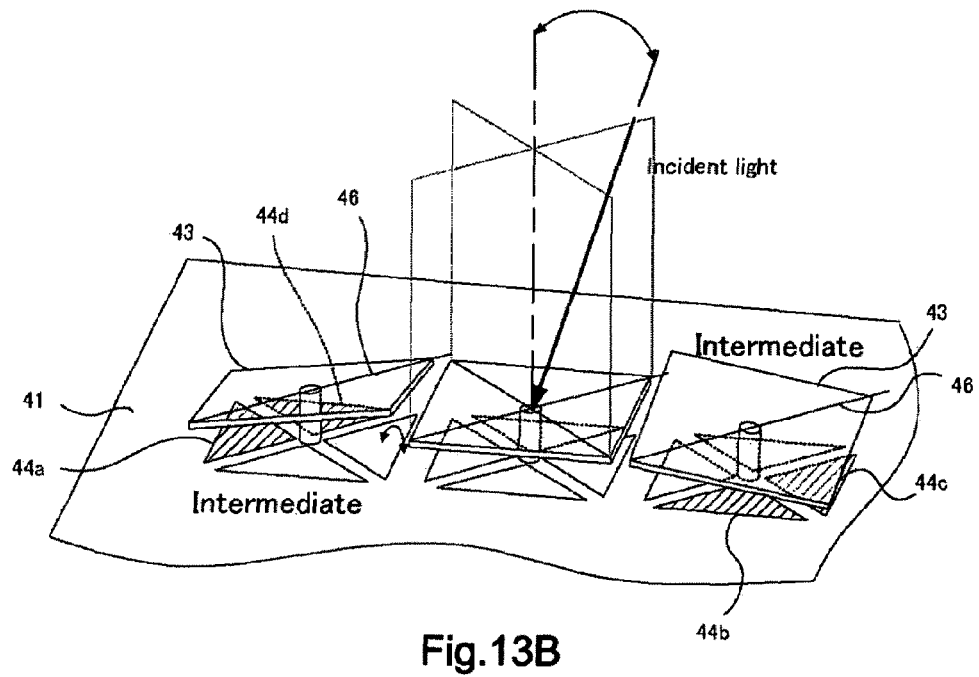
FIG. 13B is a second diagram describing another example of the intermediate grayscale control unit outputting an intermediate gray scale by a method other than an oscillation control of a mirror element.

FIGS. 13A and 13B are diagrams for describing another exemplary embodiment to generate an intermediate light intensity for increasing the number of gray scales for image display. The SLM 1 according to the present example is a micromirror device comprising a plurality of pixel elements (i.e., mirror elements) placed in array. According to the configuration of the present example, each pixel element comprises an approximate square mirror 43 that is supported on a flexibly deflectable hinge 42 disposed on a substrate 41. Four electrodes 44 (i.e., 44a, 44b, 44c and 44d) are disposed on the substrate corresponding to the four zones obtained by dividing the mirror 43 by two diagonal lines which constitute the deflection axes of the mirror 43. The four electrodes 44 allow individual controls.

With such a configuration, by applying a prescribed voltage to the electrodes 44c and 44d inclines the mirror 43 to the direction shown by the mirror on the left side of FIG. 13A and thereby controls the mirror 43 in an ON state, for each pixel element. The deflection axis of the mirror 43 in this event is the axis 45. This enables a reflection (i.e., a deflection) of an incident light to the image projection light path, that is, an output of an ON gray scale.

Also by applying a prescribed voltage to the electrodes 44a and 44b inclines the mirror 43 to a direction as shown for the mirror on the right side of FIG. 13A and controls the mirror 43 in an OFF state. The deflection axis of the mirror 43 in this event is also the axis 45. This enables a reflection (i.e., a deflection) of an incident light away from the image projection light path and the mirror generates an output of an OFF gray scale.

When a prescribed voltage is applied to the electrodes 44a and 44d, or electrodes 44b and 44c, the mirror 43 is controlled to incline to a direction on the left side, or right side, of FIG.

13B. The mirror 43 in controlled to operate in an intermediate state. The deflection axis of the mirror 43 under this control process is the axis 46 that is practically perpendicular to the axis 45. A reflection from the mirror as a part of an incident light is reflected to the image projection light path for providing a brightness with intermediate light intensity for generating additional intermediate gray scales.

Also with such a configuration, by controlling each of the four electrodes allows a modulation of the mirror to generate light intensity corresponding to a ON state, an OFF state and additional gray states between the ON and OFF states.

Figure 14:
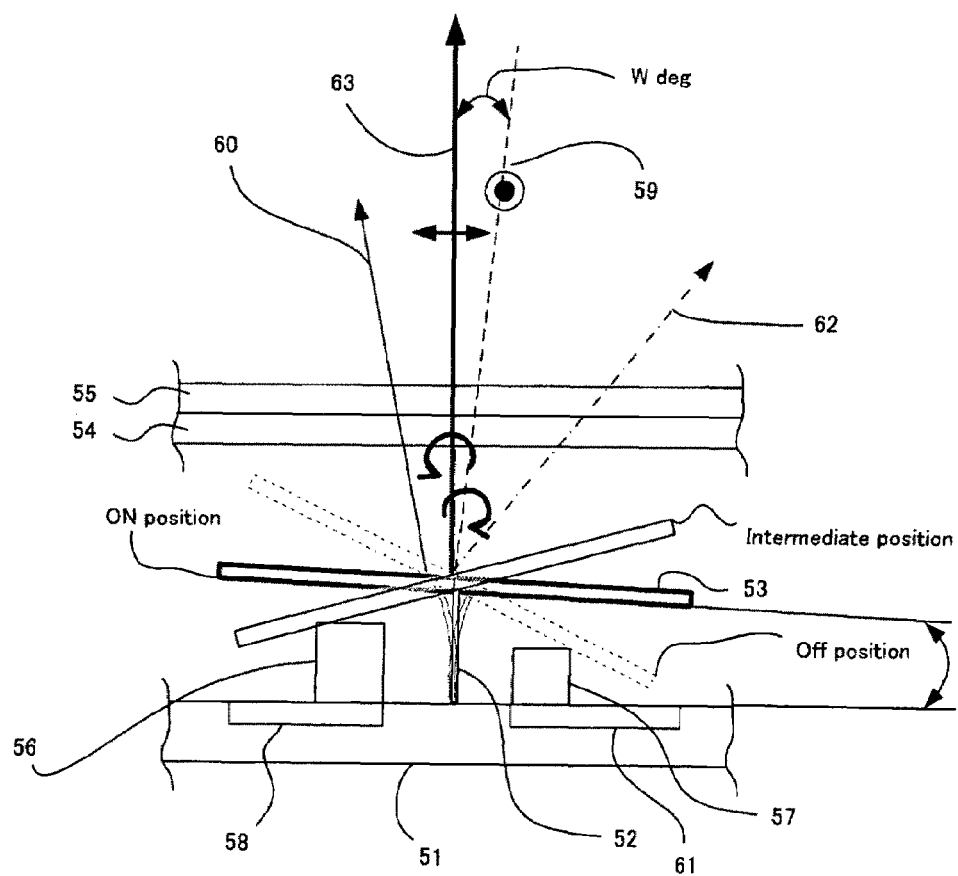
FIG. 14 is a diagram describing yet another example of the intermediate grayscale control unit outputting an intermediate gray scale by a method other than an oscillation control of a mirror element.

FIG. 14 is a cross section view for describing an exemplary embodiment of controlling a mirror operation to generate an output light of an intermediate intensity. The SLM 1, according to this embodiment, is implemented as a micromirror device that includes a plurality of pixel elements (i.e., mirror elements) placed in array. In the present example, each pixel element comprises a mirror 53 supported on a deflectable hinge 52 extending vertically from a substrate 51 for flexibly tilt to different angles as illustrated in FIG. 14. The mirror 53 is protected by covering with a transparent cover glass 54 that may be a part of the package for the micromirror device. A quarter (¼) wavelength plate 55 is adhesively stuck to the top surface of the cover glass 54. The ¼ wavelength plate 55 may be a sheet form made of a material such as polyvinyl chloride (PVC) or a coated with the material. The ¼ wavelength plate 55 may also be attached to the bottom surface of the cover glass 54. The ¼ wavelength plate 55 may be configured to place wavelength plates over the top surface and under the bottom surface of the cover glass 54 so as to perform the function of a ¼ wavelength plate by letting an illumination light transmits the respective wavelength plates. A stopper 56 and an OFF stopper 57 of different heights are disposed on the substrate 51 and is in substantially symmetrical positions across from the hinge 52.

An electrode 58 is disposed under the stopper 56 to allow the mirror 53 to be drawn by a coulomb force and incline to the position to contact the stopper 56, when a prescribed voltage is applied to the electrode. The mirror 53 is controlled to operate in an intermediate state for reflecting a light of intermediate gray scale. The position of the mirror 53 in this event is referred to as an intermediate position. This enables the mirror to reflect only a part of the incident light 59 to the image projection light path to project an intermediate gray scale between the ON and OFF states. The optical axis 60 shows that the optical axis functions as the intermediate light axis of the reflection light in the intermediate state.

Likewise, an OFF electrode 61 is also disposed under the OFF stopper 57 to allow the mirror 53 to be drawn by a coulomb force and incline to the position to contact the OFF stopper 57, when a prescribed voltage is applied to the electrode. The state of the mirror 53 in this event is referred to as an OFF state, and the position of the mirror 53 in this event is referred to as an OFF position. This enables a reflection (i.e., a deflection) of the incident light 59 to a direction outside of the image projection light path. The optical axis 62 shows that the optical axis functions as the OFF light axis of the reflection light in the OFF state. Meanwhile, by applying a prescribed voltage to each of the electrode 58 and the OFF electrode 61 holds the mirror 53 in the state of inclining by a prescribed angle relative to the substrate 51. The prescribed angle is W/2 degrees, where the incident angle of the incident light 59 is W degrees. The state of the mirror 53 in this event is referred to as an ON state, and the position of the mirror 53 is referred to as an ON position. This enables a reflection (i.e., a deflection) of the incident light 59 to the image projection light path. The optical axis 63 shows that the optical axis functions as the ON light axis of the reflection light in the ON state.

The incident light 59 projected as an linearly polarized illumination light such as an S polarization with a lined up polarization state transmits through the ¼ wavelength plate 55 and enters into a pixel element at the incident angle of W degrees relative to the pixel element shown as mirror 53 in the horizontal state. The incident light 59 changes its polarization state from the linear polarization to a counterclockwise circular polarization or an elliptical polarization after transmitting through the ¼ wavelength plate 55. With the mirror 53 operating in the ON state, the incident light 59 is reflected approximately upward in relation to the pixel element to the image projection light path. Otherwise, when the mirror 53 is in the OFF state, the incident light 59 is reflected away from the projection light path. Alternately, if the mirror 53 is in the intermediate state, only a part of the incident light 59 is reflected to the image projection light path. Therefore, the deflected light with a reduced light intensity than the fully-ON light intensity is reflected to the image projection light path.

The incident light 59 changes its polarization states from the circular polarization (or an elliptical polarization) of the left turn to that of the right turn by when reflected from the mirror 53 of the ON state. The reflected light changes the polarization states from the circular polarization (or an elliptical polarization) of the right turn to a linear polarization such as a P polarization after transmitting through the ¼ wavelength plate 55. By controlling the electrode 58 and the OFF electrode 61 makes it possible to control the ON gray scale, OFF gray scale or intermediate gray scale between the ON state and OFF state.

The display control system as described is applicable not only to a single-plate image display system comprising a single SLM but also to a multi-plate image display system comprising a plurality of SLMs.

The following descriptions on examples of optical configuration of the single-plate and multi-plate image display system to which the above described display control system is applied.

Figure 15:
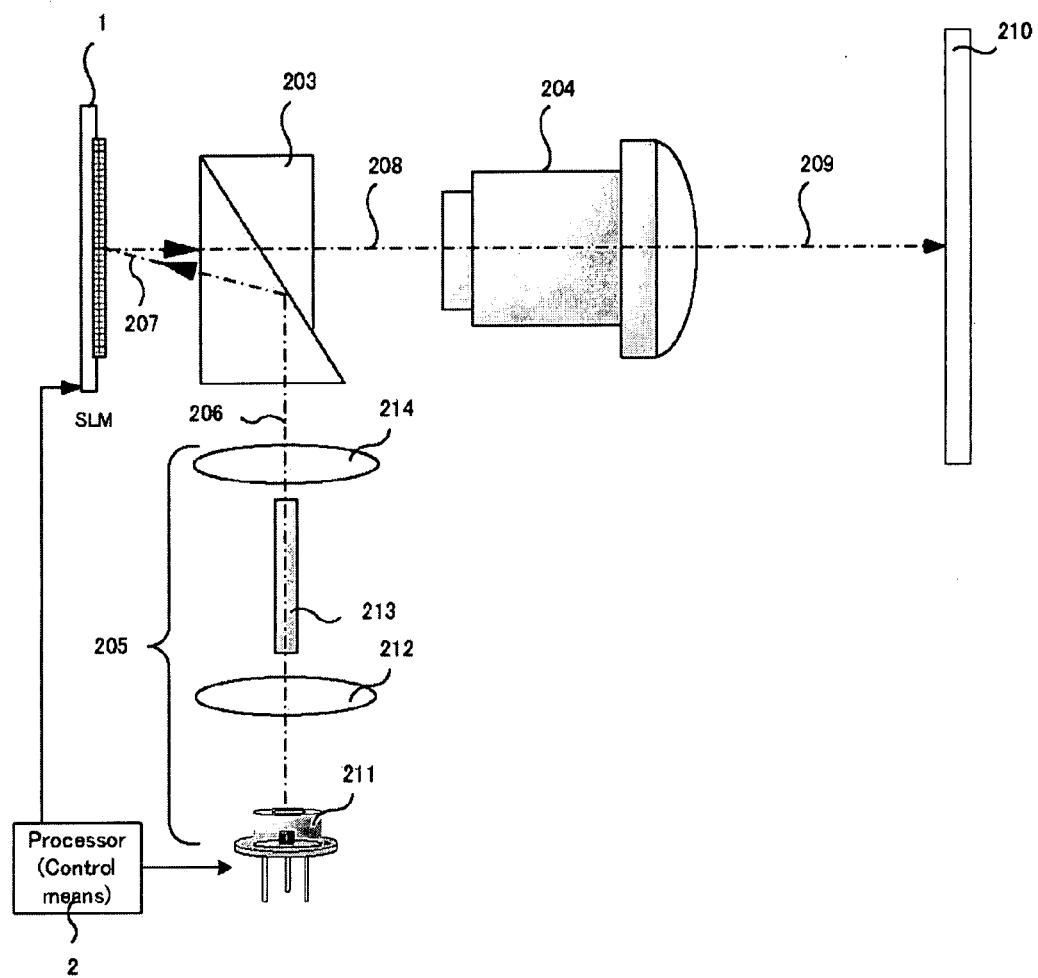
FIG. 15 is a diagram exemplifying an optical configuration of a single-plate image display system to which a display control system is applied.

FIG. 15 is a diagram exemplifying an optical configuration of a single-plate image display system to which the above described display control system is applied. The image display system shown in FIG. 15 comprises one SLM 1, a processor 2 for controlling a light source 211 and the SLM 1, a Total Internal Reflection (TIR) prism 203, a projection optical system 204, and a light source optical system 205. The SLM 1 and the TIR prism 203 are placed on the optical axis of the projection optical system 204, and the light source optical system 205 is arranged so that its optical axis becomes orthogonal to that of the projection optical system 204. The TIR prism 203 functions to make illumination light 206, which is incident from the light source optical system 205, on one side, incident to the SLM 1 at a predetermined inclination angle as incident light 207, and to make reflection light 208, which is vertically reflected by the SLM 1, pass through and reach the projection optical system 204. The projection optical system 204 projects the reflection light 208 incoming via the SLM 1 and TIR prism 203 on a screen 210 as projected light 209. The light source optical system 205 comprises a light source 211 for generating the illumination light 206, a condenser lens 212 for concentrating the illumination light 206, a rod integrator 213, and a condenser lens 214. The light source 211, condenser lens 212, rod integrator 213, and condenser lens 214 are placed, in the aforementioned order, on the optical axis of the illumination light 206 output from the light source 211 and incident to the side of the TIR prism 203.

The optical configuration exemplified in FIG. 15 is capable of implementing a color display on the screen 210 by virtue of a color sequential method by using one SLM 1. In this case, the light source 211, being constituted by a red laser light source, a green laser light source, and a blue laser light source which enable an independent control of the respective light emission states, divides one frame of display data into a plurality of sub-fields (i.e., three sub-fields respectively corresponding to R (Red), G (Green), and B (Blue) in this case), and turns on the red, green, and blue laser light sources in time series in the respective time durations corresponding to the sub-fields of the individual colors.

Figure 16A:
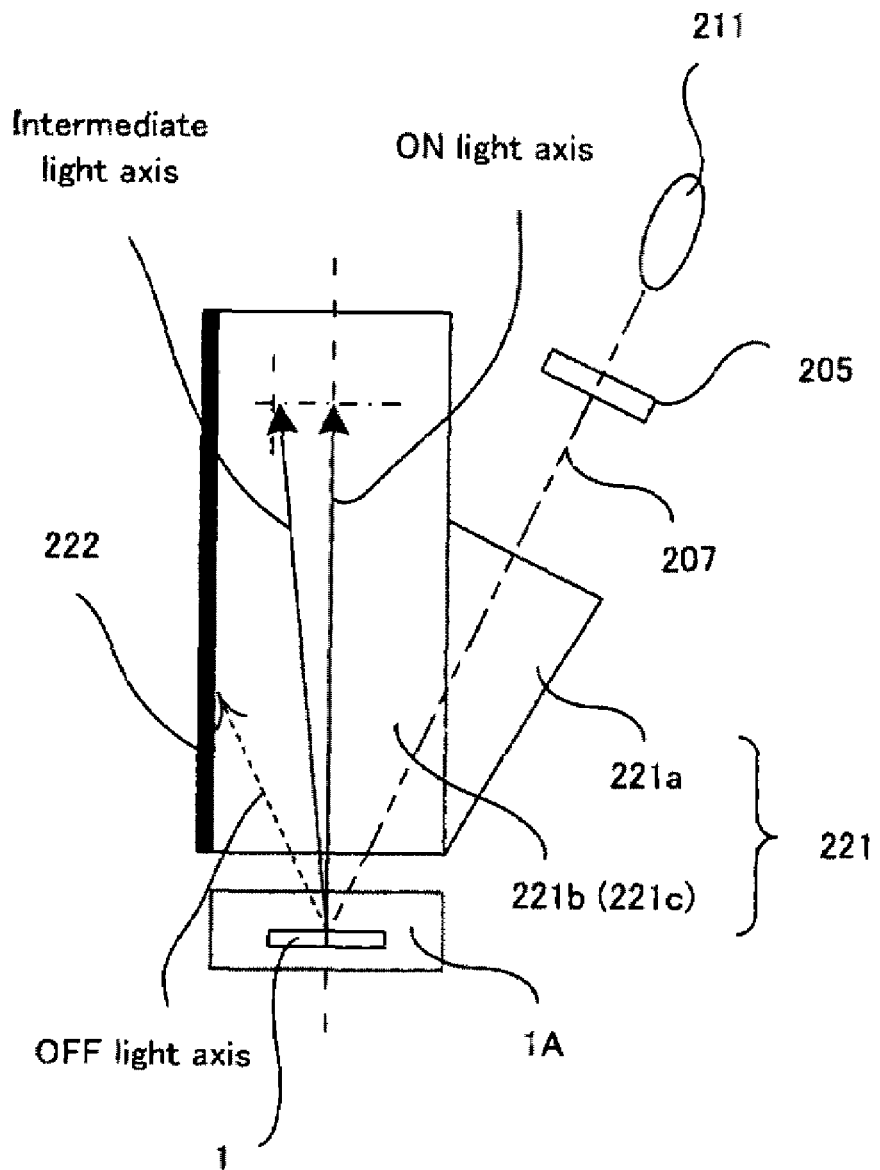
FIG. 16A is a side view diagram exemplifying an optical configuration of a two-plate image display system to which a display control system is applied.
Figure 16B:
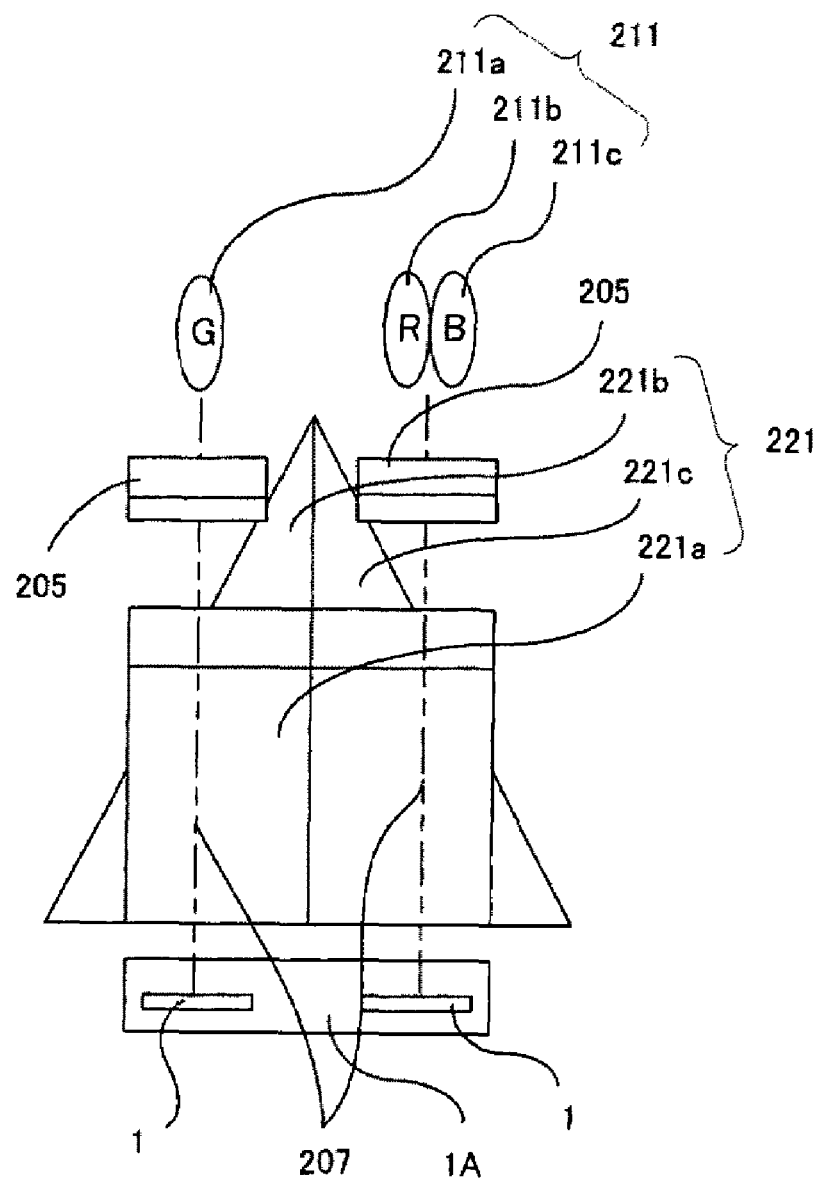
FIG. 16B is a front view diagram exemplifying an optical configuration of a two-plate image display system to which a display control system is applied.
Figure 16C:
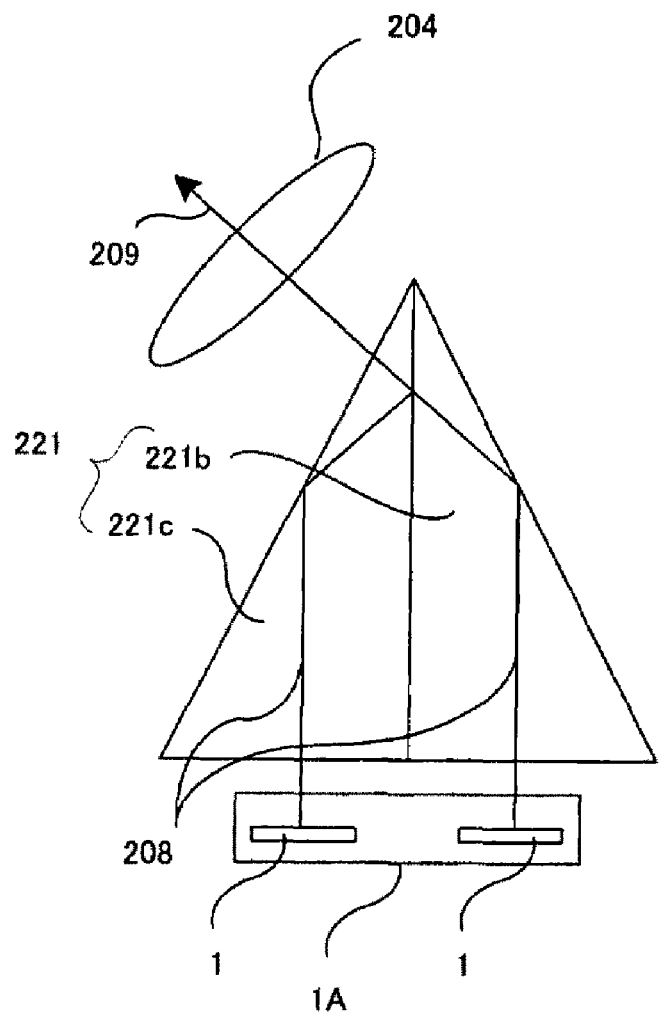
FIG. 16C is a rear view diagram exemplifying an optical configuration of a two-plate image display system to which a display control system is applied.

FIGS. 16A, 16B and 16C are diagrams exemplifying an optical configuration of a two-plate image display system to which the above described display control system is applied. FIG. 16A is the side view, FIG. 16B is the front view, and FIG. 16C is the rear view. In FIGS. 16A, 16B and 16C, the same component sign is assigned to the same constituent component as one shown in FIG. 15, except that the light source 211 is depicted independently of the light source optical system 205 in this example. Also, FIGS. 16A, 16B and 16C omit a showing of a processor 2 controlling the light source 211 and SLM 1.

The optical configuration exemplified in FIGS. 16A, 16B, and 16C comprises a device package 1A incorporating the two SLMs 1, a color synthesis optical system 221, a light source optical system 205, and a light source 211. The two SLMs 1 mounted in the device package 1A are fixed so that their rectangular contours tilt approximately 45 degrees in a horizontal plane in relation to each side of the device package 1A also having a rectangular contour. The color synthesis optical system 221 is arranged above the device package 1A. The color synthesis optical system 221 is constituted by prisms 221b and 221c of right-angled triangle poles, which are joined to form practically an equilateral triangular pole on the long side faces, and an optical guide block 221a of a right-angled triangle pole, the oblique faces of which are joined with its bottom upwardly oriented, on the side faces of the prisms 221b and 221c. In the prisms 221b and 221c, a light absorber 222 is provided on a side opposite to the face on which the optical guide block 221a is joined. On the bottom face of the optical guide block 221a, provided are a light source optical system 205 of a green laser light source 211a, and a light source optical system 205 of a red laser light source 211b and of a blue laser light source 211c with their optical axes oriented vertical. An illumination light output from the green laser light source 211a is incident, as incident light 207, to one of the SLMs 1 positioned immediately below the prism 221b via the optical guide block 221a and prism 221b. And, illumination lights output from the red laser light source 221b and blue laser light source 211c are incident, as incident lights 207, to the other SLM 1 positioned immediately below the prism 221c via the optical guide block 221a and prism 221c. The red and blue incident lights 207 incident to the SLM 1 are reflected within the prism 221c vertically upward as reflection light 208, further reflected on the outer side surface of the prism 221c and joined face, in this order, incident to the projection optical system 204, and result in projected light 209 when the state of the pixel element is in the ON state (e.g., the mirror element shown in FIG. 9A is in the ON state). In contrast, the green incident light 207 incident to the SLM 1 is reflected within the prism 221b vertically upward as reflection light 208, further reflected on the outer side surface of the prism 221b, incident to the projection optical system 204 by tracking the same optical path as the red and blue reflection light 208, and results in becoming the projection light 209 when the state of the pixel element is in the ON state (e.g., the mirror element shown in FIG. 9A is in the ON state).

As described above, in the optical configuration exemplified in FIGS. 16A, 16B and 16C, only the incident light 207 from the green laser light source 211a is illuminated onto one of the SLMs 1 incorporated in the device package 1A, and the incident light 207 from at least either of the red laser light source 211b or blue laser slight source 211c is illuminated onto the other SLM 1. The lights respectively modulated by the two SLMs 1 are concentrated within the color synthesis optical system 221, enlarged by the projection optical system 204, and projected onto a screen or the like as projected light 209 as described above.

Note that, in the FIG. 16A, for example, the "ON light axis" shows an axis of the reflection light (deflection light) when the mirror 16 is in the ON state shown in FIG. 9A and the "OFF light axis" shows an axis of the reflection light (deflection light) when the mirror 16 is in the OFF state shown in FIG. 9B and the "Intermediate light axis" shows an axis of the reflection light (deflection light) when the mirror 16 is in one state of the oscillation state shown in FIG. 9C.

Figure 17:
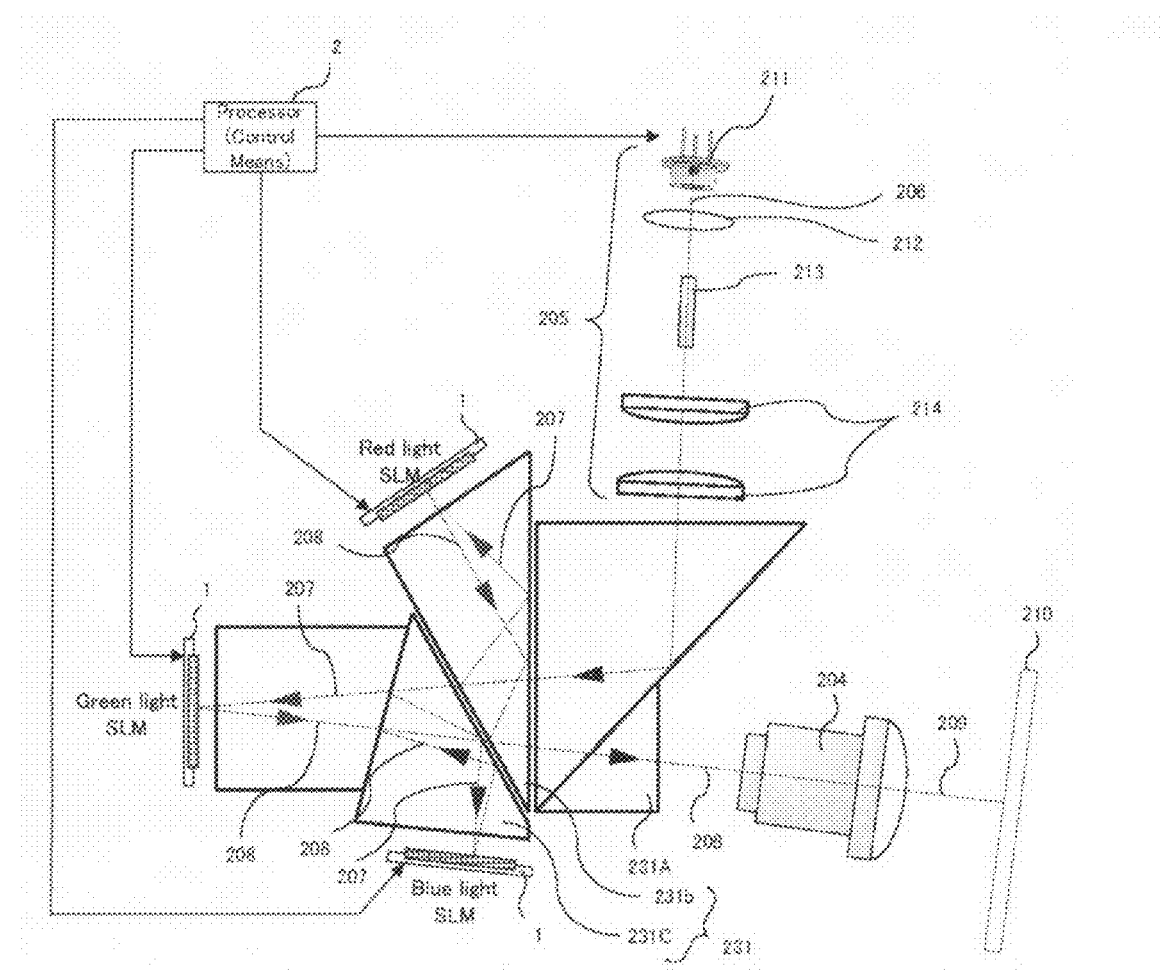
FIG. 17 is a diagram exemplifying an optical configuration of a three-plate image display system to which a display control system is applied.

FIG. 17 is a diagram exemplifying an optical configuration of a three-plate image display system to which the above described display control system is applied. Also in FIG. 17, the same component sign is assigned to the same constituent component as one shown in FIG. 15. The image display system shown in FIG. 17 comprises three SLMs 1, with a light separation/synthesis optical system 231 being placed between a projection optical system 204 and each of the three SLMs 1. The light separation/synthesis optical system 231 is constituted by three TIR prisms 231A, 231b and 231C. The TIR prism 231A functions for guiding illumination light 206, which is incident from the side face of the optical axis of the projection optical system 204, to the SLM 1 side as incident light 207. The TIR prism 231b functions for separating red (R) light from the incident light 207 incoming via the TIR prism 231A, making the separated light incident to the SLM 1 for red color, and guiding its reflection light 208 to the TIR prism 231A. Similarly, the TIR prism 231C functions for separating blue (B) and green (G) lights from the incident light 207 incoming via the TIR prism 213A, making the separated lights incident to the SLMs 1 for blue and green colors, and guiding their reflection lights 208 to the TIR prism 231A. Accordingly, spatial light modulations for the three colors such as R, G, and B are simultaneously performed, and the reflection lights 208 resultant from the modulations becomes the projected light 209 via the projection optical system 204, and projected on the screen 210, thereby performing a color display.

As such, the present invention has been described in detail; the present invention, however, apparently allows various improvements and modifications within the scope thereof, in lieu of being limited to the embodiments described above.

As described above, the present invention makes it possible to improve the accuracy of a modulation control and accomplish the brightness of an image satisfying the display purpose and the expression of more sufficient gray scales in a display control system employing an SLM comprising a plurality of pixel elements placed in array.

What is claimed is:

1. A display system including a spatial light modulator (SLM) having a plurality of pixel elements for modulating a light to project an image comprising:

a first control unit for controlling each of the plurality of pixel elements for modulating said light under a state of ON or OFF;

a second control unit for controlling each of the plurality of pixel elements for modulating said light under a state other than the ON or OFF states; and a control changeover unit for changing over from one of said first or second control unit to another control unit in modulating said light to project an image from each of said pixel elements.

2. The display system according to claim 1 wherein:

said control changeover unit further dividing a frame period for each of said pixel elements into a period for the first control unit and second control unit for controlling each of said pixel elements for modulating said light according to an ON/OFF state modulation and an intermediate state modulation.

3. The display system according to claim 2, wherein the division data change unit changing the first control unit-data by subtracting a predetermined change value from said first control unit data and also changing the second control unit data by adding the change value to said second control unit data if a value of the second control unit data is smaller than a predetermined change threshold value.

4. The display system according to claim 1 further comprising:

a data division unit for dividing an input data for each of the plurality of pixel elements into first control unit data for inputting to the first control unit, and second control unit data for inputting to the second control unit depending on contents of said input data.

5. The display system according to claim 4, further comprising:

a data conversion process unit provided for applying a first data conversion process to the first control unit data in compliance with the first control unit and also applying a second data conversion process to the second control unit data in compliance with the second control unit, and a division data change unit for checking the first control unit data and the second control unit data for determining whether to change a division of said first and second control unit data depending on data contents of said first and second control unit data as checked by said division data change unit.

6. The display control system according to claim 5, wherein the division data change unit providing different data division ratios to the data division unit and said data division unit applying said different data division ratios for dividing the input data again; and the data conversion process unit applying said first and second data conversion processes again to covert said first and second control unit data after said data division dividing the input data by applying said different data dividing ratios.

7. The display system according to claim 1, wherein the first control unit is a pulse width modulation (PWM) control unit for generating a display light intensity according to a total length of time each of said pixel elements is controlled at said ON state.

8. The display control system according to claim 7, wherein the PWM control unit controls each of said pixel elements of the SLM at an ON state continuously for a period with a length of time equal to a value obtained by multiplying an integer to a predetermined control unit time duration in accordance with an input data.

9. The display control system according to claim 1, wherein the second control unit is an intermediate state control unit for controlling a display light intensity according to an intermediate control process.

10. The display system according to claim 9, wherein the SLM is a micromirror device comprising a plurality of mirror elements placed in array, and the intermediate state control unit controls each of said mirror elements to operate in an oscillation state.

11. The display system according to claim 9, wherein the intermediate state control unit controls each of said mirror elements to oscillate for a predefined time period in accordance with contents of received data.

12. The display control system according to claim 9, wherein the intermediate state control unit controls each of said mirror elements to oscillate in a predefined time period according to a plurality of control unit time durations.

13. The display control system according to claim 9, wherein the intermediate state control unit controls each of said mirror elements to oscillate a predefined number of times in accordance with contents of received data.

* * * * *